United States Patent
Sohn et al.

(10) Patent No.: US 10,169,042 B2
(45) Date of Patent: Jan. 1, 2019

(54) MEMORY DEVICE THAT PERFORMS INTERNAL COPY OPERATION

(71) Applicants: Young-soo Sohn, Seoul (KR); Sei-jin Kim, Yongin-si (KR); Kwang-il Park, Yongin-si (KR); Tae-young Kim, Seoul (KR); Chul-woo Park, Yongin-si (KR)

(72) Inventors: Young-soo Sohn, Seoul (KR); Sei-jin Kim, Yongin-si (KR); Kwang-il Park, Yongin-si (KR); Tae-young Kim, Seoul (KR); Chul-woo Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 101 days.

(21) Appl. No.: 14/852,774

(22) Filed: Sep. 14, 2015

(65) Prior Publication Data

US 2016/0147460 A1     May 26, 2016

(30) Foreign Application Priority Data

Nov. 24, 2014     (KR) ........................ 10-2014-0164415

(51) Int. Cl.
*G06F 12/00*     (2006.01)
*G06F 9/30*      (2018.01)
*G06F 15/78*     (2006.01)

(52) U.S. Cl.
CPC ........ *G06F 9/3004* (2013.01); *G06F 9/30032* (2013.01); *G06F 12/00* (2013.01); *G06F 15/785* (2013.01)

(58) Field of Classification Search
CPC ..................................... G06F 12/00
USPC ....................................... 711/165
See application file for complete search history.

(56) References Cited

U.S. PATENT DOCUMENTS

| 5,886,944 A | 3/1999 | Ahn |
| 7,684,241 B2 | 3/2010 | Kang et al. |
| 2002/0002661 A1* | 1/2002 | Blumenau ............... G06F 3/061 |
| | | 711/165 |

(Continued)

FOREIGN PATENT DOCUMENTS

| JP | 2009301194 A | 12/2009 |
| KR | 1020140025938 A | 3/2014 |

OTHER PUBLICATIONS

V. Seshadri, "RowClone: Fast and Energy-Efficient in-DRAM Bulk Data Copy and Initialization", The 46th Annual IEEE/ACM International Symposium on Microarchitecture, 2013, Carnegie Mellon University, New York, 13 pages.

*Primary Examiner* — Gautam Sain
(74) *Attorney, Agent, or Firm* — Harness, Dickey & Pierce, P.L.C.

(57) ABSTRACT

A memory device performing an internal copy operation is provided. The memory device may receive a source address, a destination address, and page size information together with an internal copy command, compares the source address with the destination address, and performs an internal copy operation. The internal copy operation may be an internal block copy operation, an inter-bank copy operation, or an internal bank copy operation. The internal copy operation may be performed with respect to one-page data, half-page data, or quarter-page data, based on the page size information. The memory device may output as a flag signal a copy-done signal indicating that the internal copy operation has been completed.

20 Claims, 18 Drawing Sheets

(56) References Cited

U.S. PATENT DOCUMENTS

| | | | |
|---|---|---|---|
| 2004/0049649 A1* | 3/2004 | Durrant | G06F 9/30032 |
| | | | 711/165 |
| 2009/0089515 A1 | 4/2009 | Michalak et al. | |
| 2010/0325374 A1 | 12/2010 | Cypher et al. | |
| 2011/0099326 A1* | 4/2011 | Jung | G06F 12/0246 |
| | | | 711/103 |
| 2011/0258366 A1* | 10/2011 | Schuetz | G11C 7/1063 |
| | | | 711/103 |
| 2012/0268993 A1 | 10/2012 | Park | |
| 2013/0159815 A1 | 6/2013 | Jung et al. | |
| 2013/0268727 A1 | 10/2013 | Sohn et al. | |
| 2014/0059285 A1 | 2/2014 | Kim et al. | |
| 2014/0185395 A1* | 7/2014 | Seo | G11C 7/22 |
| | | | 365/189.17 |
| 2014/0195480 A1 | 7/2014 | Talagala et al. | |
| 2014/0351515 A1* | 11/2014 | Chiu | G06F 3/0605 |
| | | | 711/117 |

\* cited by examiner

| BA_CMP | BLK_CMP | COPY OPERATION |
|--------|---------|----------------|
| 1 | 1 | INTERNAL BLOCK COPY |
| 0 | × | INTER BANK COPY |
| 1 | 0 | INTERNAL BANK COPY |

MEMORY DEVICE THAT PERFORMS INTERNAL COPY OPERATION

CROSS-REFERENCE TO RELATED APPLICATIONS

This application claims the benefit of Korean Patent Application No. 10-2014-0164415, filed on Nov. 24, 2014, in the Korean Intellectual Property Office, the disclosure of which is incorporated herein in its entirety by reference.

BACKGROUND

Example embodiments of the inventive concepts relate to semiconductor memory devices. For example, at least some example embodiments relate to a memory device and/or a memory system that perform an internal copy operation in order to support memory defragmentation.

A system provides an environment enabling users to easily and efficiently use application programs based on an operating system (OS). The OS may allocate, manage, and protect system hardware and software resources, monitor for errors generated in user programs or wrong use of resources, and manage calculations and control of resources such as an input/output device. The OS may allocate a program code, which is a collection of commands and data, to a memory device in order to execute an application program. During the memory allocation, the OS may store, via paging, the program code in units of pages that each have a certain size of a block. In memory devices, since the program code may be stored in discontinuous data regions of the memory device, fragmentation of the memory cell region may occur. A system may require a memory device to have an empty continuous memory space for storing a big amount of data. In this case, the memory device may need to perform a copy operation to secure an empty continuous memory space.

SUMMARY

Example embodiments of the inventive concepts provide a memory device performing an internal copy operation in order to support memory defragmentation, a method of operating the memory device, and/or a system including the memory device.

According to an example embodiment of the inventive concepts, a memory device may include a memory cell array. The memory cell array may include a plurality of memory cell rows; a command decoder which receives a source address and a destination address together with an internal copy command from an external source and compares the source address with the destination address to determine an internal copy operation mode; and a control logic unit which selects an internal copy operation according to a result of the determination, controls the selected internal copy operation to be performed in the memory cell array, and outputs as a flag signal a copy-done signal indicating that the internal copy operation has been completed.

According to another example embodiment of the inventive concepts, a method of operating a memory device having a plurality of memory cell rows may include: receiving a source address and a destination address together with an internal copy command; comparing the source address with the destination address; when the source address and the destination address indicate a same bank and a same block as a result of the comparison, performing an internal block copy operation of reading data of a first memory cell row within the same block within the same bank and writing the read data to a second memory cell row within the block within the bank; when the source address and the destination address indicate different banks as a result of the comparison, performing an inter-bank copy operation of reading data of a first bank and writing the read data to a second bank; and when the source address and the destination address indicate a same bank as a result of the comparison, performing an internal bank copy operation of reading data of a first block within the same bank and writing the read data to a second block within the same bank.

According to another example embodiment of the inventive concepts, a memory device may include a memory cell array configured to store data in memory cells therein; and a controller configured to, receive, from an external memory controller, an internal copy command along with a source address and a destination address associated therewith, and perform an internal copy operation on the memory cell array from the memory cells associated with a source address to the memory cells associated with a destination address.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
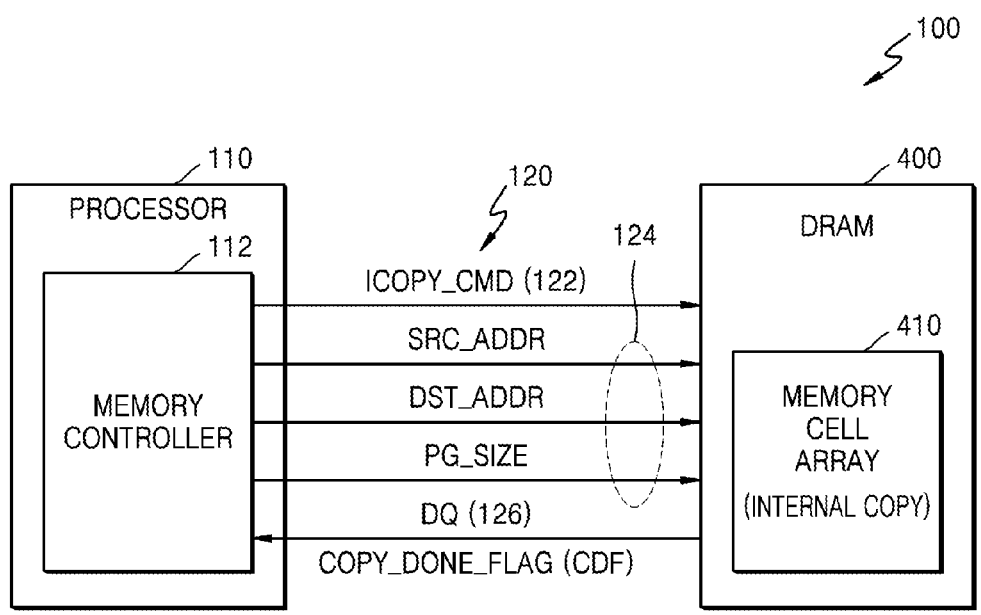
FIG. 1 is a block diagram of a system including a memory device capable of performing an internal copy operation, according to an example embodiment of the inventive concepts.

As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the inventive concepts will be described more fully with reference to the accompanying drawings, in which example embodiments of the inventive concepts are shown. These example embodiments are provided so that this disclosure will be thorough and complete, and will fully convey the scope of the example embodiments of the inventive concepts to one of ordinary skill in the art. As the inventive concepts allow for various changes and numerous example embodiments, particular example embodiments will be illustrated in the drawings and described in detail in the written description. However, this is not intended to limit the inventive concepts to particular modes of practice, and it is to be appreciated that all changes, equivalents, and substitutes that do not depart from the spirit and technical scope of the example embodiments of the inventive concepts are encompassed in the inventive concepts. In the drawings, like reference numerals denote like elements and the sizes or thicknesses of elements may be exaggerated for clarity of explanation.

The terms used in the present specification are merely used to describe particular embodiments, and are not intended to limit the example embodiments of the inventive concepts. An expression used in the singular encompasses the expression in the plural, unless it has a clearly different meaning in the context. In the present specification, it is to be understood that the terms such as "including", "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
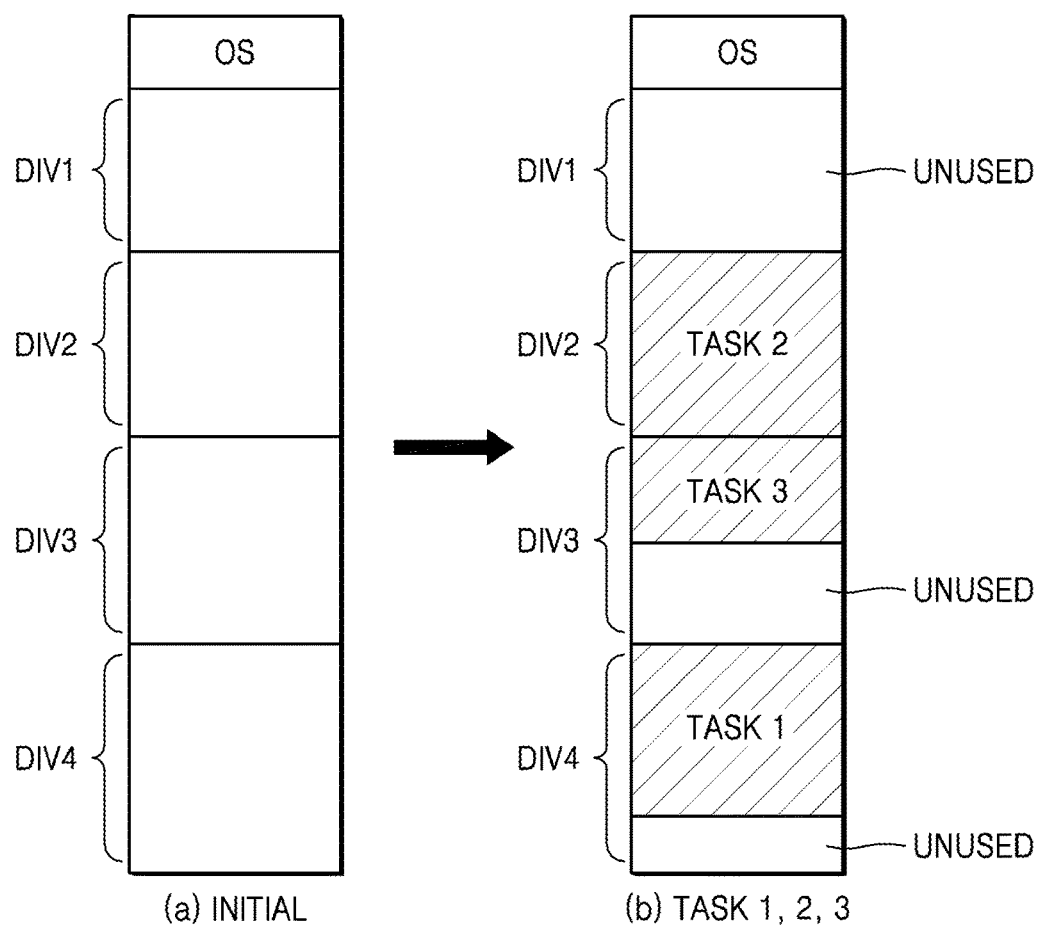
FIG. 2 is a block diagram for explaining defragmentation of a memory device.

FIG. 1 is a block diagram of a system 100 including a memory device 400 capable of performing an internal copy operation, according to an example embodiment of the inventive concepts. FIG. 2 is a block diagram for explaining defragmentation of a memory device.

Referring to FIGS. 1 and 2, the system 100 may include a processor 110 and the memory device 400. The system 100 may access the memory device 400 via an operating system (OS). The OS may repeatedly allocate memory cell regions for processes or tasks and release the memory cell regions. Consequently, in a memory region of the memory device 400, a plurality of divisions DIV1-DIV4 are generated, as illustrated in FIG. 2, and an available memory region is smaller than a memory region size required by a process. Thus, the memory region may not satisfy OS requirements, and fragmentation, in which a memory region is left unused, may occur.

To use an empty memory region of the memory device 400, the system 100 may support defragmentation based on pages, which are units by which memory is managed. In the defragmentation, the system 100 may rearrange fragmented files stored in the memory device 400 such that the memory region may be more efficiently used.

In FIG. 1, the processor 110 may include a memory controller 112 that supports memory transactions such as a read operation and/or a write operation. The memory controller 112 may access the memory device 400 in response to a memory transaction of the processor 110. A command, an address, and data of the memory controller 112 may be transmitted to the memory device 400 via a bus 120. The memory device 400 may output data or a signal in response to the command and the address of the memory controller 112, and transmit the data or the signal to the memory controller 112 via the bus 120. The bus 120 may include a command line 122, address lines 124, and a data input/output (DQ) line 126.

According to some example embodiments, the bus 120 may be configured such that the command line 122 and the address lines 124 are implemented by using a single line and command and addresses may be sequentially transmitted. According to other example embodiments, the bus 120 may further include a signal line via which a flag signal that is output by the memory device 400 in response to the command of the memory controller 112 is transmitted.

According to some example embodiments, the memory controller 112 may be embodied as a separate chip from the processor 110. The memory controller 112 may perform a memory transaction via a chipset that is separate from the processor 110 and is included in the system 100. For example, when the system 100 is a computing device, the chipset may include at least one integrated circuit (IC) package or chip that connects components, such as Basic Input/Output System (BIOS) firmware, keyboards, a mouse, storage devices, and network interfaces, to the processor 110.

The memory device 400 may include various memory devices that provide addressable storage locations from and/or to which the memory controller 112 reads and/or writes data. The memory device 400 may be implemented by using, for example, Dynamic Random Access Memory (DRAM) devices, Synchronous DRAM (SDRAM) devices, Double Data Rate (DDR) SDRAM devices, or the other memory devices.

The memory device 400 includes a memory cell array 410 including memory cells arranged in a hierarchical manner. In detail, the memory cell array 410 may include at least one bank, each of which may include a plurality of blocks. Each of the blocks may include a plurality of memory cell rows and sense amplifiers that sense and amplify memory cells respectively connected to the memory cell rows. A memory cell row of a block may be referred to as a page.

The memory controller 112 may control the memory device 400 according to a defragmentation request of the processor 110. The memory controller 112 may generate an internal copy command ICPOY_CMD and transmit the internal copy command ICOPY_CMD together with a source address SRC_ADDR and a destination address DST_ADDR to the memory device 400. The internal copy command ICOPY_CMD may be provided to the memory device 400 via the command line 122 and may instruct an internal copy operation of the memory device 400 to be performed.

The source address SRC_ADDR and the destination address DST_ADDR may be provided to the memory device 400 via the address lines 124. The memory device 400 may perform an internal copy operation so that data of a memory region corresponding to the source address SRC_ADDR is stored in a memory region corresponding to the destination address DST_ADDR.

Each of the source address SRC_ADDR and the destination address DST_ADDR may include a bank address, a row address, and a column address. The row address may include a block address and a memory cell row address (or a page address). The internal copy operation may be performed so that data in a memory cell row of a block within a bank corresponding to the source address SRC_ADDR is written to memory cells connected to a memory cell row of a block within a bank corresponding to the destination address DST_ADDR.

The memory controller 112 may transmit page size information PG_SIZE, together with the internal copy command ICOPY_CMD, the source address SRC_ADDR, and the destination address DST_ADDR, to the memory device 400. In the page size information PG_SIZE, the data of the memory cell row (or page) with respect to which the internal copy operation is to be performed may be set as one-page data, half (½)-page data, or quarter (¼)-page data. The internal copy operation may be performed so that data of memory cells corresponding to the page size information PG_SIZE among data in a memory cell row of a block within a bank corresponding to the source address SRC_ADDR is written to memory cells corresponding to the page size information PG_SIZE among the memory cells connected to a memory cell row of a block within a bank corresponding to the destination address DST_ADDR.

According to some example embodiments, the page size information PG_SIZE may be provided via the column addresses of the source address SRC_ADDR and the destination address DST_ADDR The column addresses of the source address SRC_ADDR and the destination address DST_ADDR may be provided to a column decoder included in the memory device 400, and the column decoder may select data corresponding to the column addresses of the source address SRC_ADDR and the destination address DST_ADDR. The column decoder may operate in connection with a column selection circuit or an IO gating circuit such that one-page data, half (½)-page data, or quarter (¼)-page data is selected as data of the memory cell rows with respect to which the internal copy operation is to be performed.

Internal copy operations of the memory device 400 may be classified into an internal block copy operation, an inter-bank copy operation, and an internal bank copy operation. The memory device 400 may compare the source address SRC_ADDR with the destination address DST_ADDR and select one from an internal block copy operation, an inter-bank copy operation, and an internal bank copy operation.

In the internal block copy operation, when the source address SRC_ADDR and the destination address DST_ADDR indicate the same bank and the same block, data of a first memory cell row within the same block of the same bank may be read and written to a second memory cell row within the same block of the same bank. In the inter-bank copy operation, when the source address SRC_ADDR and the destination address DST_ADDR indicate different banks, namely, first and second banks, data of the first bank may be read and written to the second bank. In the internal bank copy operation, when the source address SRC_ADDR and the destination address DST_ADDR indicate a same bank, data of a first block in the same bank may be read and written to a second block in the same bank.

After the memory device 400 performs an internal block copy operation, an inter-bank copy operation, or an internal bank copy operation, the memory device 400 may generate a copy-done flag signal COPY_DONE_FLAG (CDF) indicating that an internal copy operation has been completed. The copy-done flag signal CDF may be transmitted to the memory controller 112 via the DQ line 126. The memory controller 112 may determine whether the internal copy command ICOPY_CMD issued to the memory device 400 has been performed, according to the copy-done flag signal CDF. According to some embodiments, the memory device 400 may output the copy-done flag signal CDF to the memory controller 112 via a dedicated pin.

Figure 3:
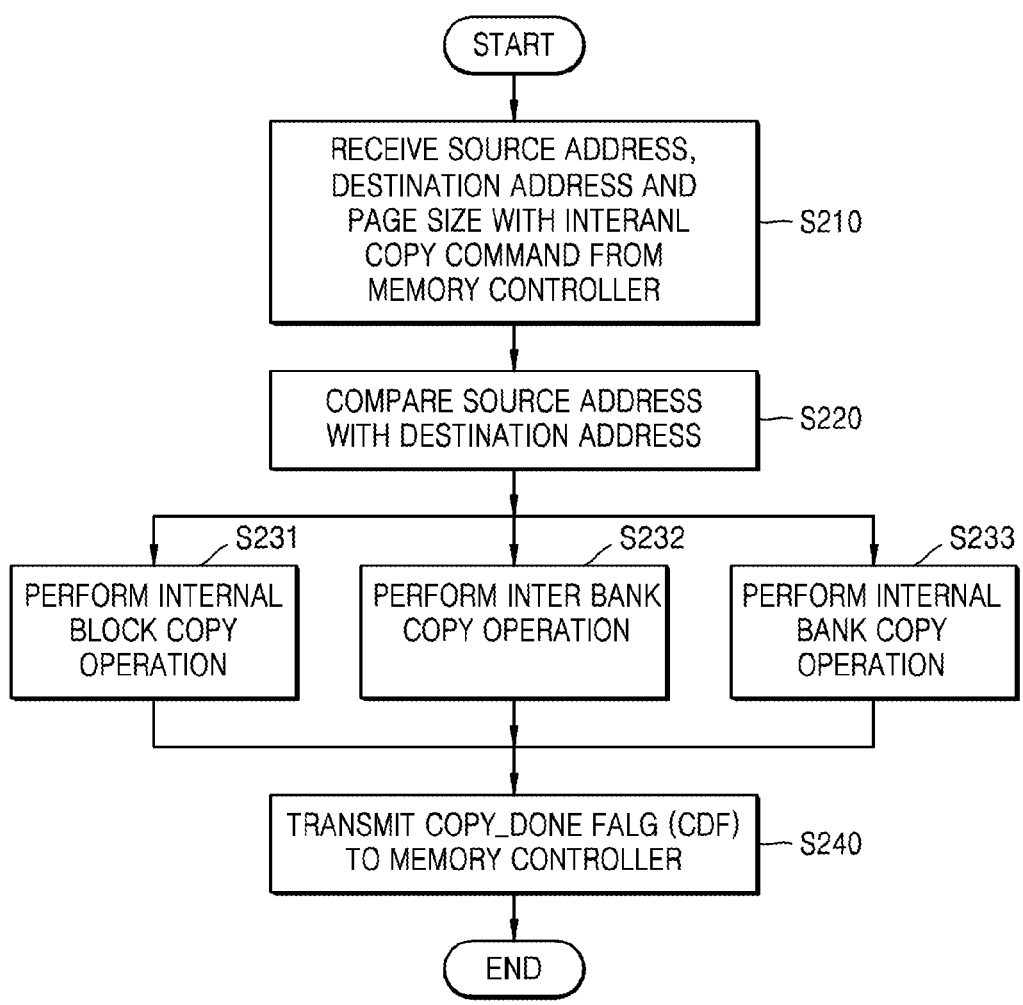
FIG. 3 is a flowchart of a method in which the memory device is operated by the memory controller of FIG. 1.

FIG. 3 is a flowchart of a method in which the memory device 400 is operated by the memory controller 112 of FIG. 1.

Referring to FIGS. 1 and 3, the memory device 400 may receive the source address SRC_ADDR and the destination address DST_ADDR together with the internal copy command ICPOY_CMD from the memory controller 112, in operation S210. Each of the source address SRC_ADDR and the destination address DST_ADDR may include a bank address, a row address, and a column address. The row address may include a block address and a page address.

In operation S220, the memory device 400 may compare the source address SRC_ADDR with the destination address DST_ADDR. The bank address and the block address of the source address SRC_ADDR may be compared with those of the destination address DST_ADDR. As a result of the comparison, the memory device 400 may select one from an internal block copy operation, an inter-bank copy operation, and an internal bank copy operation.

When the source address SRC_ADDR and the destination address DST_ADDR indicate a same bank and a same block as a result of the comparison, the memory device 400 may perform an internal block copy operation of reading data of a first memory cell row within the same block of the same bank and writing the read data to a second memory cell row within the same block of the same bank, in operation S231.

When the source address SRC_ADDR and the destination address DST_ADDR indicate different banks as a result of the comparison, the memory device 400 may perform an inter-bank copy operation of reading data of a first bank and writing the read data to a second bank, in operation S232.

When the source address SRC_ADDR and the destination address DST_ADDR indicate a same bank as a result of the comparison, the memory device 400 may perform an internal bank copy operation of reading data of a first block included in the bank and writing the read data to a second block included in the bank, in operation S233.

After the internal block copy operation S231, the inter-bank copy operation S232, or the internal bank copy operation S233 has been completed, the memory device 400 may output, as the copy-done flag signal CDF, a copy-done signal COPY_DONE indicating that an internal copy operation has been completed, in operation S240. The copy-done flag signal CDF may be provided to the memory controller 112. The memory controller 112 may determine whether the internal copy command ICOPY_CMD issued to the memory device 400 has been performed.

In the above-described method of operating the memory device 400, the source address SRC_ADDR and the destination address DST_ADDR received together with the internal copy command ICOPY_CMD may be compared with each other, and the internal block copy operation, the inter-bank copy operation, or the internal bank copy operation may be selectively performed in a memory cell array region of the memory device 400. Hence, the memory controller 112 may instruct an internal copy operation without needing to consider the structure of the memory cell array region.

Figure 4:
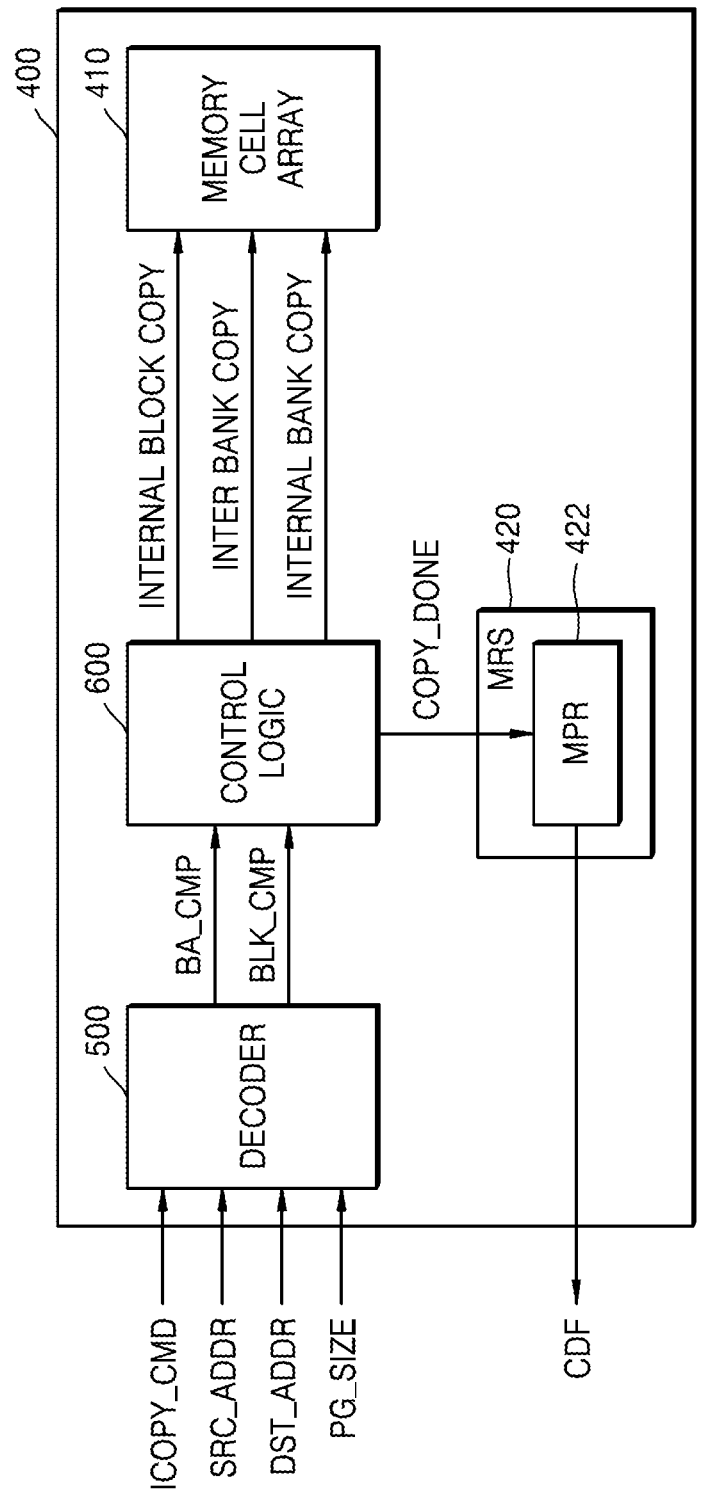
FIG. 4 illustrates a structure of a memory cell array included in the semiconductor memory device illustrated in FIG. 1.

FIG. 4 is a block diagram of the memory device 400 of FIG. 1.

Referring to FIG. 4, the memory device 400 may include a memory cell array 410, a mode register (MRS) 420, a decoder 500, and a data logic unit 600.

The memory cell array 410 may include at least one bank, each of which may include a plurality of blocks. Each of the blocks may include a plurality of memory cell rows (or pages), and sense amplifiers that sense and amplify memory cells respectively connected to the memory cell rows. The memory cell array 410 may perform an internal block copy operation, an inter-bank copy operation, or an internal bank copy operation in response to the internal copy command ICOPY_CMD, the source address SRC_ADDR, and the destination address DST_ADDR received from the memory controller 112 of FIG. 1. The internal block copy operation, the inter-bank copy operation, and the internal bank copy operation will be described in more detail later with reference to FIGS. 7-9.

The decoder 500 may receive the internal copy command ICPOY_CMD, the source address SRC_ADDR, and the destination address DST_ADDR from the memory controller 112 of FIG. 1. The internal copy command ICOPY_CMD may command the memory cell array 410 to perform an internal copy operation in order to defragment a memory region of the memory device 400. The internal copy operation may be performed so that data of memory cells connected to a memory cell row corresponding to the source address SRC_ADDR is written to memory cells connected to a memory cell row corresponding to the destination address DST_ADDR.

The decoder 500 may receive page size information PG_SIZE together with the internal copy command ICOPY_CMD, the source address SRC_ADDR, and the destination address DST_ADDR. A memory cell row corresponding to the source address SRC_ADDR or the destination address DST_ADRR may be referred to as a page. In the page size information PG_SIZE, one-page data, half (½)-page data, or quarter (¼)-page data may be set as data of the memory cell row with respect to which an internal copy operation is to be performed. According to the page size information PG_SIZE, internal copy operations with respect to various sizes of data may be performed.

The decoder 500 may control the internal copy operation so that data of memory cells corresponding to the page size information PG_SIZE in a memory cell row corresponding to the source address SRC_ADDR is written to memory cells corresponding to the page size information PG_SIZE in a memory cell row corresponding to the destination address DST_ADDR. The page size information PG_SIZE will be described in more detail later with reference to FIGS. 10-12.

Each of the source address SRC_ADDR and the destination address DST_ADDR may include a bank address, a block address, and a page address. The page address may be the same as a memory cell row address. The decoder 500 may compare the bank address of the source address SRC_ADDR with that of the destination address DST_ADDR to output a bank comparison signal BA_CMP. The decoder 500 may compare the block address of the source address SRC_ADDR with that of the destination address DST_ADDR to output a block comparison signal BLK_CMP.

A control logic unit 600 may select one from the internal block copy operation, the inter-bank copy operation, and the internal bank copy operation according to the bank comparison signal BA_CMP and the block comparison signal BLK_CMP. The control logic unit 600 may control the selected internal copy operation to be performed in the memory cell array 410. When the selected internal copy operation has been completed in the memory cell array 410, the control logic unit 600 may generate a copy-done signal COPY_DONE.

The control logic unit 600 may include a processor and a memory (not shown).

The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The processor may be, a central processing unit (CPU), a controller, or an application-specific integrated circuit (ASIC), that, when executing instructions stored in the memory, configures the processor as a special purpose computer configured to select an internal copy operation based on the bank comparison signal BA_CMP and the block comparison signal BLK_CMP, and to perform the selected internal copy operation on the memory cell array 410. Further, upon completion of the selected internal copy operation, the processor may be further configured to output the copy-done signal COPY-DONE. Therefore, the memory device 400 may perform the internal copy operation autonomously and without the external memory controller 112 requiring knowledge of the structure of the memory cell array 410.

The copy-done signal COPY-DONE may be provided to the MRS 420. The MRS 420 may provide a plurality of operation options of the memory device 400 and program various functions, characteristics, and modes of the memory device 400. The MRS 420 may provide a function of a multi-purpose register (MPR) 422.

The control logic unit 600 may store the copy-done signal COPY_DONE in the MPR 422 of the MRS 420. Data may be read from the MPR 422 of the MRS 420 according to a mode register read command of the memory controller 112 of FIG. 1. The copy-done signal COPY_DONE stored in the MPR 422 may be output as the copy-done flag signal CDF.

Figure 5:
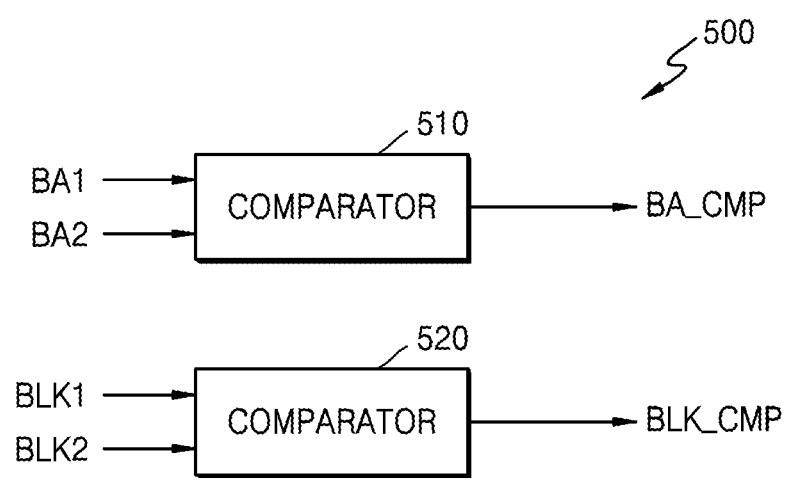
FIG. 5 illustrates a structure of a memory cell array included in the semiconductor memory device illustrated in FIG. 4.

FIG. 5 is a block diagram of a portion of the decoder 500 of FIG. 4.

Referring to FIG. 5, the decoder 500 may include a first comparator 510 and a second comparator 520. The first comparator 510 may compare a bank address BA1 of the source address SRC_ADDR with a bank address BA2 of the destination address DST_ADDR to output the bank comparison signal BA_CMP. The bank comparison signal BA_CMP may indicate whether the source address SRC_ADDR and the destination address DST_ADDR indicate the same bank or different banks.

For example, in some example embodiments, when the bank comparison signal BA_CMP is generated with a logic high level ("1"), the source address SRC_ADDR and the destination address DST_ADDR indicate the same bank. When the bank comparison signal BA_CMP is generated with a logic low level ("0"), the source address SRC_ADDR and the destination address DST_ADDR indicate different banks. According to other example embodiments, when the bank comparison signal BA_CMP is generated with a logic low level ("0"), the source address SRC_ADDR and the destination address DST_ADDR indicate the same bank. When the bank comparison signal BA_CMP is generated with a logic high level ("1"), the source address SRC_ADDR and the destination address DST_ADDR indicate different banks.

The second comparator 520 may compare a block address BLK1 of the source address SRC_ADDR with a block address BLK2 of the destination address DST_ADDR to output the block comparison signal BLK_CMP. The block comparison signal BLK_CMP may indicate whether the source address SRC_ADDR and the destination address DST_ADDR indicate the same block or different blocks.

For example, in some example embodiments, when the block comparison signal BLK_CMP is generated with a logic high level ("1"), the block comparison signal BLK_CMP may indicate that the source address SRC_ADDR and the destination address DST_ADDR indicate the same block. When the block comparison signal BLK_CMP is generated with a logic low level ("0"), the block comparison signal BLK_CMP may indicate that the source address SRC_ADDR and the destination address DST_ADDR address different blocks. According to other example embodiments, when the block comparison signal BLK_CMP is generated with a logic low level ("0"), the block comparison signal BLK_CMP may indicate that the source address SRC_ADDR and the destination address DST_ADDR indicate the same block. When the block comparison signal BLK_CMP is generated with a logic high level ("1"), the block comparison signal BLK_CMP may indicate that the source address SRC_ADDR and the destination address DST_ADDR address different blocks.

Figure 6:
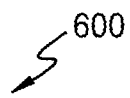
FIG. 6 is a table for explaining an operation of the control logic unit of FIG. 4.

FIG. 6 is a table for explaining an operation of the control logic unit 600 of FIG. 4.

Referring to FIG. 6, the control logic unit 600 may select an internal copy operation, based on the bank comparison signal BA_CMP and the block comparison signal BLK_CMP output by the decoder 500 of FIG. 5. For example, when the bank comparison signal BA_CMP has a logic high level ("1") and thus indicates that the source address SRC_ADDR and the destination address DST_ADDR indicate the same bank, and the block comparison signal BLK_CMP has a logic high level ("1") and thus indicate that the source address SRC_ADDR and the destination address DST_ADDR indicate the same block, the control logic unit 600 may select an internal block copy operation. In other words, the internal block copy operation means an internal copy operation that is performed in the same block within the same bank.

When the bank comparison signal BA_CMP has a logic low level ("0") and thus indicates that the source address SRC_ADDR and the destination address DST_ADDR indicate different banks, the control logic unit 600 may select an inter-bank copy operation. In other words, the inter-bank copy operation means an internal copy operation that is performed between different banks.

For example, when the bank comparison signal BA_CMP has a logic high level ("1") and thus indicates that the source address SRC_ADDR and the destination address DST_ADDR indicate the same bank, and the block comparison signal BLK_CMP has a logic low level ("0") and thus indicate that the source address SRC_ADDR and the destination address DST_ADDR address different blocks, the control logic unit 600 may select an internal bank copy operation. In other words, the internal bank copy operation means an internal copy operation that is performed between different blocks within the same bank.

Figure 7:
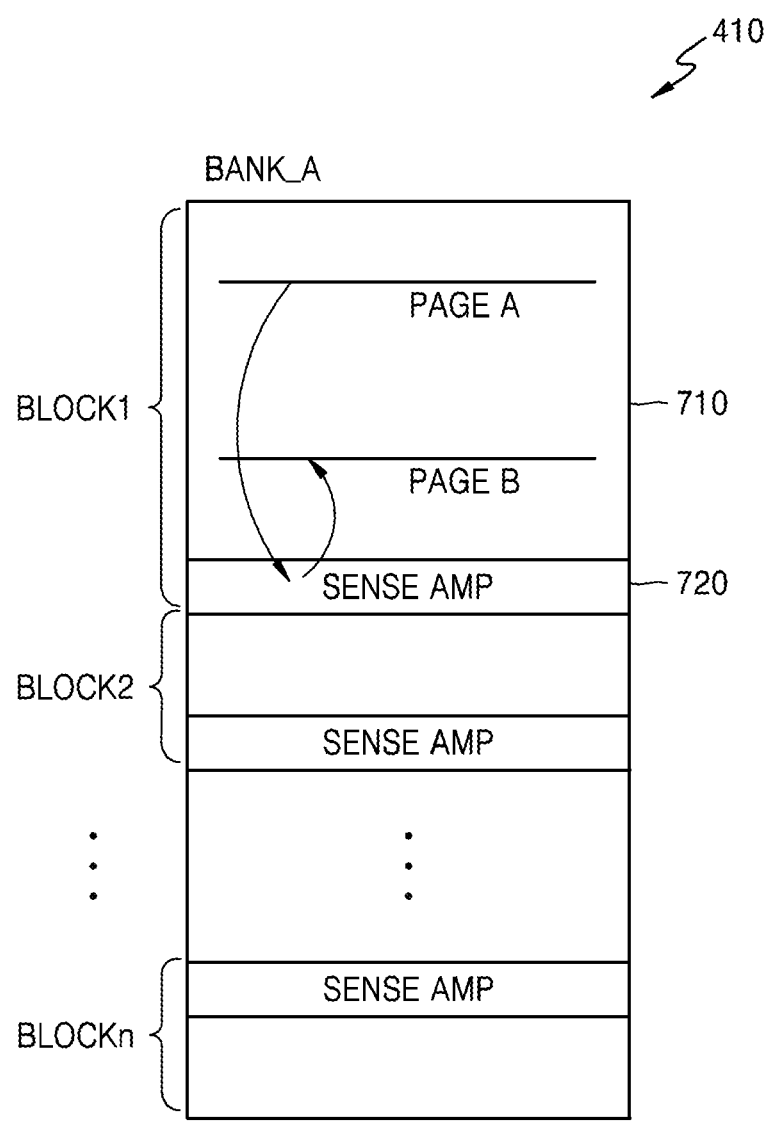
FIG. 7 illustrates a structure of a memory cell array included in the semiconductor memory device illustrated in FIG. 4.

FIG. 7 is a block diagram for explaining an internal block copy operation performed in the memory cell array 410 of FIG. 4.

Referring to FIG. 7, one bank BANK_A including a plurality of blocks BLOCK1-BLOCKn (where n is a natural number) is illustrated. Each of the blocks BLOCK1-BLOCKn may include a memory cell region 710 including a plurality of memory cell rows (pages), and a sense amplification region 720 including bitline sense amplifiers that sense and amplify data of memory cells respectively connected to the memory cell rows. The memory cell rows may be addressed by the page addresses respectively included in the source address SRC_ADDR and the destination address DST_ADDR.

The internal block copy operation may be performed in one block within the bank BANK_A. For example, the internal block copy operation may be performed so that data of a memory cell row corresponding to the page address of the source address SRC_ADDR within the block BLOCK1 is written to a memory cell row corresponding to the page address of the destination address DST_ADDR within the block BLOCK1. The memory cell row corresponding to the page address of the source address SRC_ADDR is referred to as a first page PAGE_A, and the memory cell row corresponding to the page address of the destination address DST_ADDR is referred to as a second page PAGE_B.

The internal block copy operation is performed within the block BLOCK1 so that data of memory cells connected to the first page PAGE_A is read and sensed and amplified by the bitline sense amplifiers of the sense amplification region 720, and sensed and amplified data is written to memory cells connected to the second page PAGE_B.

Figure 8:
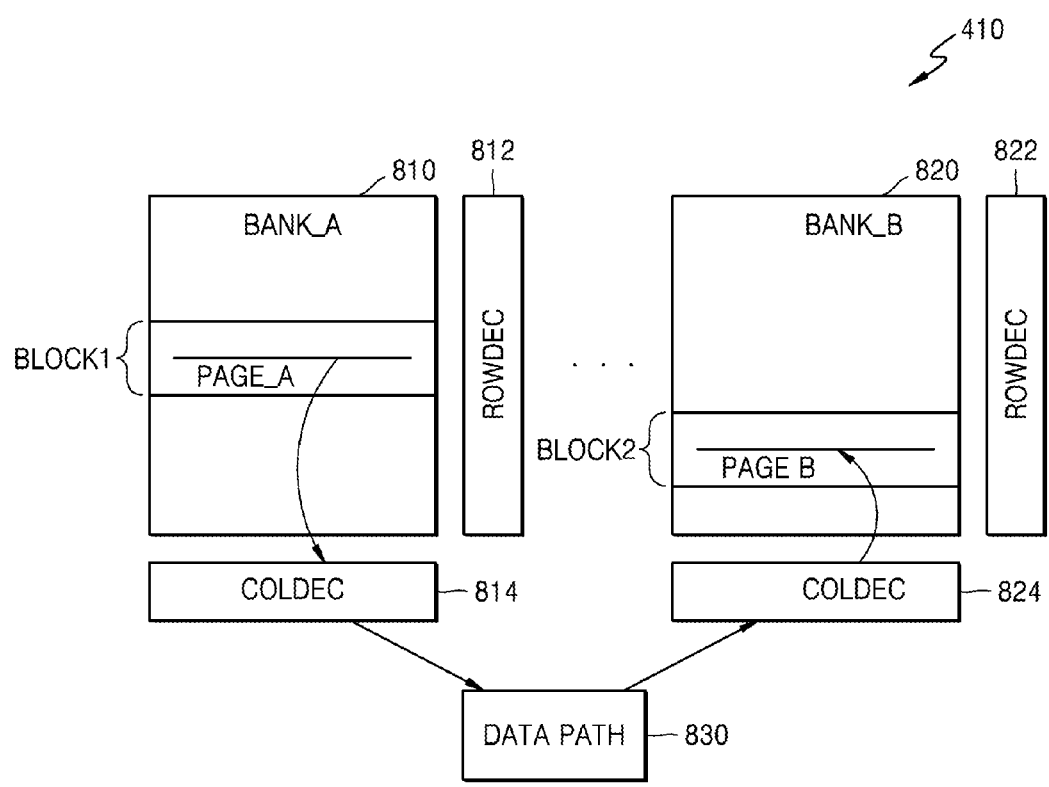
FIG. 8 illustrates a structure of a memory cell array included in the semiconductor memory device illustrated in FIG. 4.

FIG. 8 is a block diagram for explaining an inter-bank copy operation performed in the memory cell array 410 of FIG. 4.

Referring to FIG. 8, a plurality of banks BANK_A and BANK_B are illustrated. The banks BANK_A and BANK_B may be connected to row decoders 812 and 822, respectively, and to column decoders 814 and 824, respectively. The row decoders 812 and 822 may activate memory cell rows corresponding to the block address and the page address from among the memory cell rows included in the banks BANK_A and BANK_B, respectively. The column decoders 814 and 824 may select data corresponding to the column addresses from among data of the banks BANK_A and BANK_B, respectively. Memory regions 810 and 820 of the banks BANK_A and BANK_B may each include a plurality of blocks, as illustrated in FIG. 7.

The inter-bank copy operation may be performed between different banks. It is assumed that the source address SRC_ADDR addresses a first page PAGE_A of a first block BLOCK1 within the first bank BANK_A and the destination address DST_ADDR addresses a second page PAGE_B of a second block BLOCK2 within the second bank BANK_B. The inter-bank copy operation may be performed so that data of the first bank BANK_A is written to the second bank BANK_B. According to the present embodiment, the bank addresses, the block addresses, and the page addresses of the source address SRC_ADDR and the destination address DST_ADDR are all different. However, according to some example embodiments, only the bank addresses of the source address SRC_ADDR and the destination address DST_ADDR may be different, and the block addresses and the page addresses thereof may be identical.

Data of memory cells connected to the first page PAGE_A of the first block BLOCK1 within the first bank BANK_A may be read and output to a data path 830 via bitline sense amplifiers included in the first block BLOCK1 and the first column decoder 814. The first column decoder 814 may include a column selection circuit (or an I/O gating circuit) that selects data corresponding to a column address from among the data of the first page PAGE_A sensed and amplified by the bitline sense amplifiers. According to the present example embodiment, the data selected by the column selection circuit of the first column decoder 814 is one-page data of the first page PAGE_A.

According to some example embodiments, the data selected by the column selection circuit of the first column decoder 814 may be half (½)-page data or quarter (¼)-page data from the data of the first page PAGE_A based on the page size information PG_SIZE of FIG. 1.

The data of the first page PAGE_A selected by the column selection circuit of the first column decoder 814 may be transmitted to the data path 830. The data path 830 may include read data latches for storing the data output by the first bank BANK-A, and write drivers for writing data to the second bank BANK_B.

The data of the first page PAGE_A of the first block BLOCK1 within the first bank BANK_A transmitted to the data path 830 may be written to memory cells connected to the second page PAGE_B via a column selection circuit of the second column decoder 824 and a bitline sense amplifier (not shown) of the second block BLOCK2 within the second bank BANK_B.

According to some example embodiments, the column selection circuit of the second column decoder 824 may enable half-page data or quarter-page data from the data of the first page PAGE_A transmitted to the data path 830 based on the page size information PG_SIZE of FIG. 1 to be written to memory cells connected to the second page PAGE_B.

Figure 9:
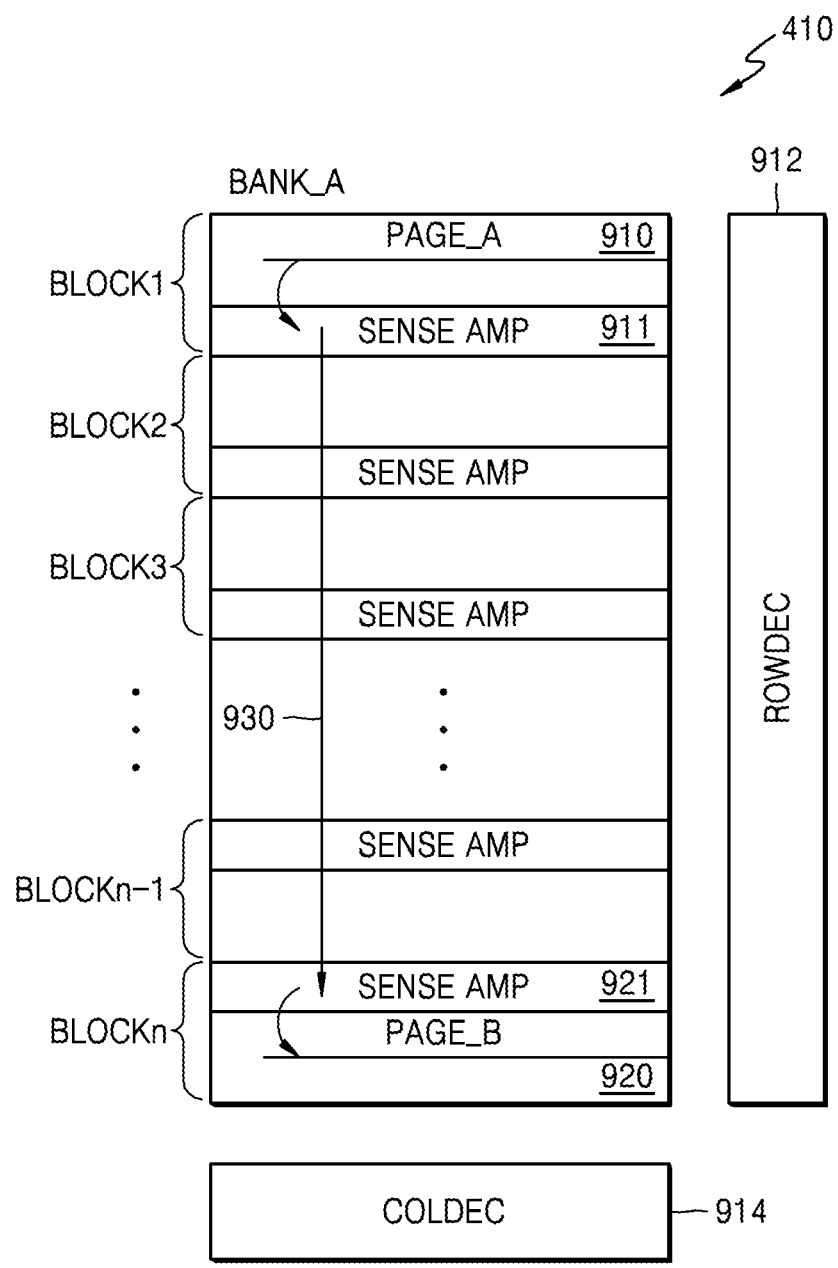
FIG. 9 illustrates a structure of a memory cell array included in the semiconductor memory device illustrated in FIG. 4.

FIG. 9 is a block diagram for explaining an internal bank copy operation performed in the memory cell array 410 of FIG. 4.

Referring to FIG. 9, one bank BANK_A including a plurality of blocks BLOCK1-BLOCKn is illustrated. The bank BANK_A may be connected to a row decoder 912 and a column decoder 914. The row decoder 912 may activate memory cell rows corresponding to the block addresses and the page addresses of the source address SRC_ADDR and the destination address DST_ADDR. The column decoder 914 may select data corresponding to the column addresses of the source address SRC_ADDR and the destination address DST_ADDR.

The internal bank copy operation may be performed within a single bank. It is assumed that the source address SRC_ADDR addresses a first page PAGE_A of the first block BLOCK1 within the bank BANK_A and the destination address DST_ADDR addresses a second page PAGE_B of the n-th block BLOCKn within the bank BANK_A. The internal bank copy operation may be performed so that the data of the first page PAGE_A of the first block BLOCK1 within the bank BANK_A is written to the second page PAGE_B of the n-th block BLOCKn within the bank BANK_A.

In the internal bank copy operation, data of memory cells connected to the first page PAGE_A of a memory region 910 of the first block BLOCK1 within the bank BANK_A may be read and sensed and amplified by bitline sense amplifiers of a first sense amplification region 911 of the first block BLOCK1. The data sensed and amplified by the bitline sense amplifiers of the first sense amplification region 911 may be transmitted to a second sense amplification region 921 of the n-th block BLOCKn via a data line 930 and may be sensed and amplified by bitline sense amplifiers of the second sense amplification region 921. The data sensed and amplified by the bitline sense amplifiers of the second sense amplification region 922 may be written to memory cells connected to the second page PAGE_B of a memory region 920 of the n-th block BLOCKn.

In FIGS. 7-9, the internal block copy operation, the inter-bank copy operation, or the internal bank copy operation may be selectively performed in the memory cell array 410 according to the source address SRC_ADDR and the destination address DST_ADDR received together with the internal copy command ICOPY_CMD. Hence, the memory controller 112 of FIG. 1 may instruct an internal copy operation without needing to consider the structure of the memory cell array 410.

Figure 10:
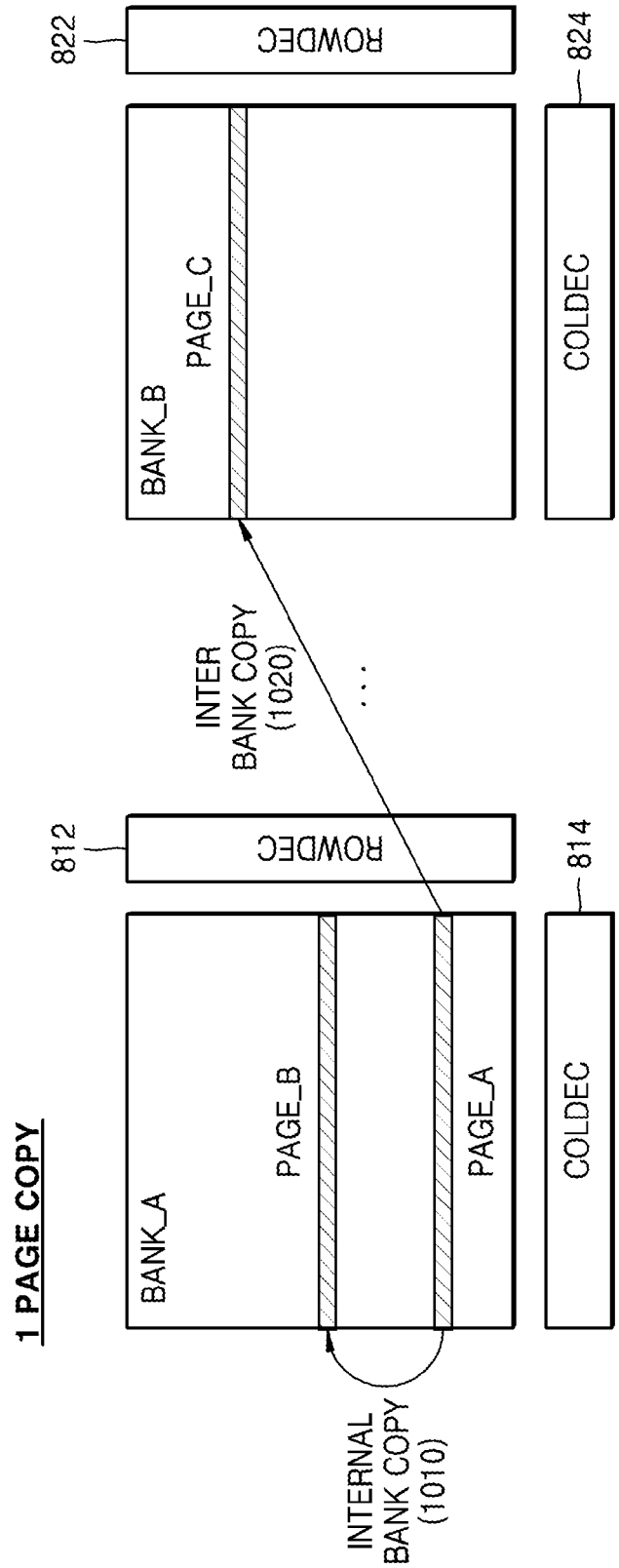
FIGS. 10-12 are block diagrams for explaining internal copy operations according to page size information, according to example embodiments of the inventive concepts.
Figure 11:
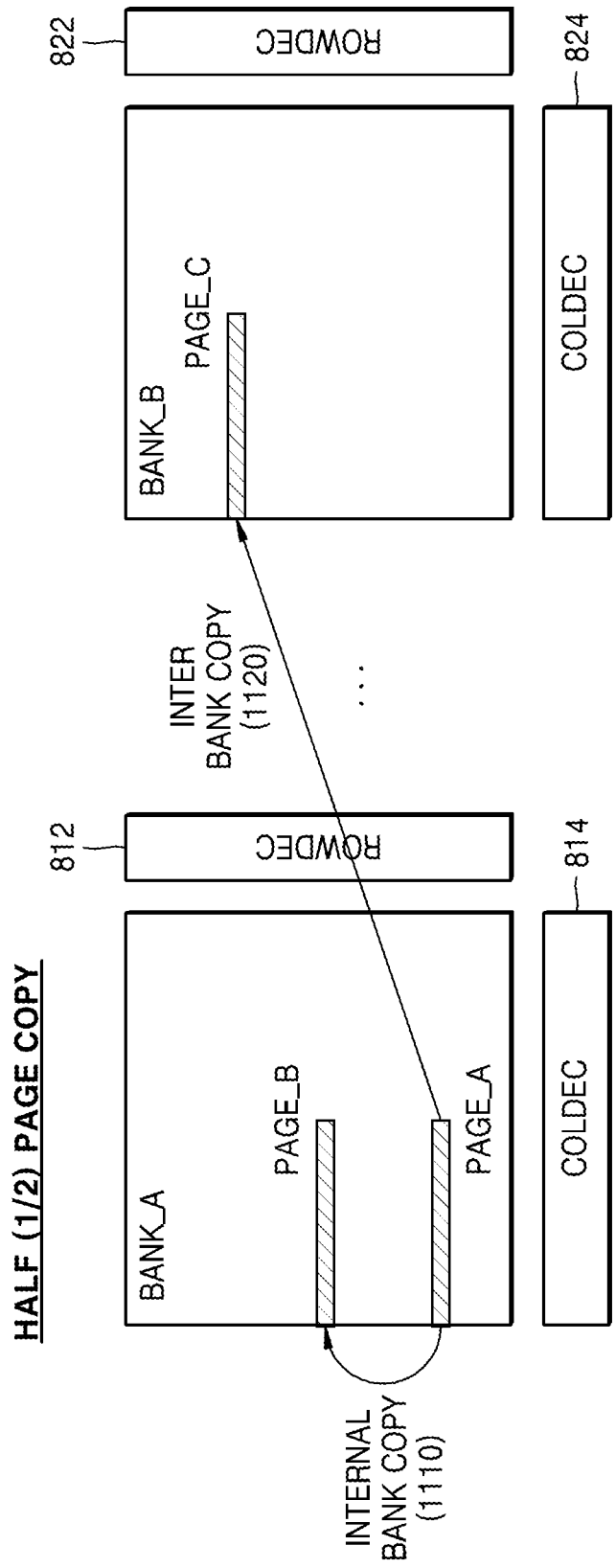
Figure 12:
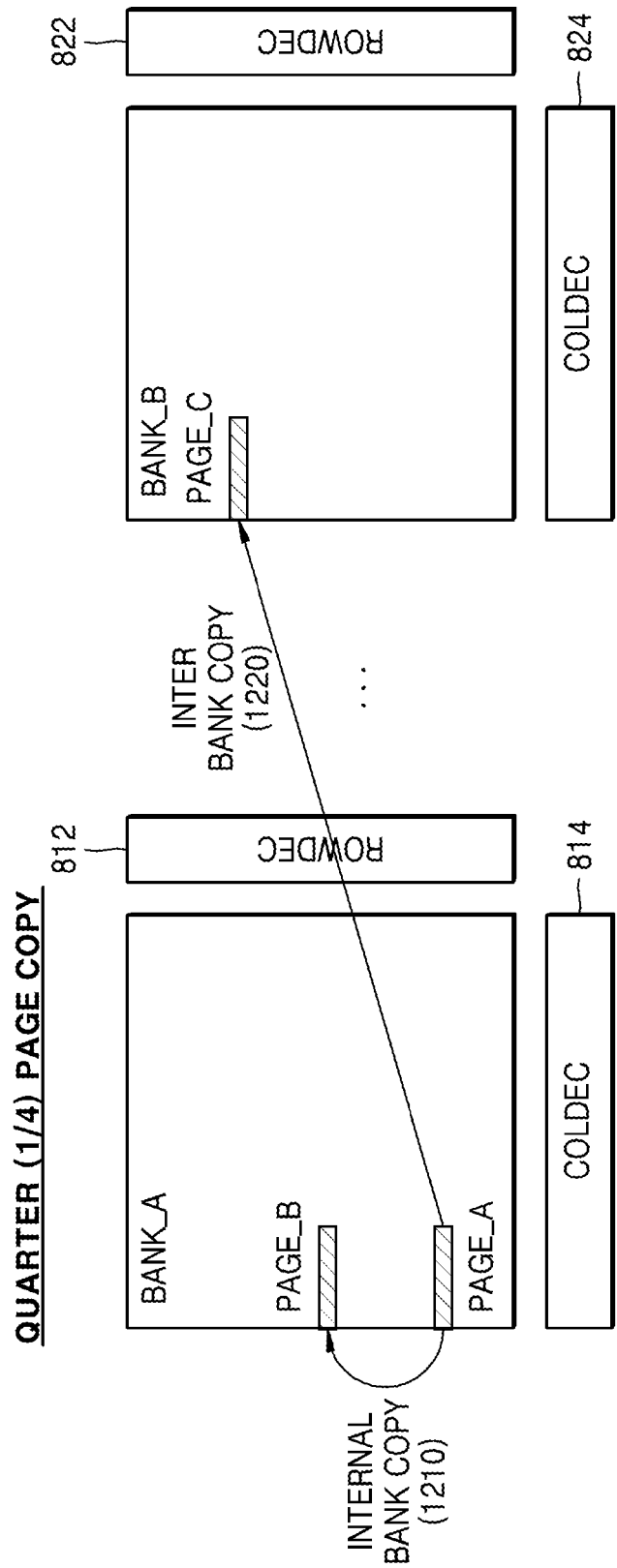

FIGS. 10-12 are block diagrams for explaining internal copy operations according to page size information, according to example embodiments of the inventive concepts. For example, FIG. 10 illustrates a one-page copy operation according to example embodiments, FIG. 11 illustrates a half-page copy operation according to example embodiments, and FIG. 12 illustrates a quarter-page copy operation according to example embodiments.

In FIGS. 10-12, the memory cell array 410 includes the plurality of banks BANK_A and BANK_B as illustrated in FIG. 8, and the banks BANK_A and BANK_B may be connected to the row decoders 812 and 822, respectively, and to the column decoders 814 and 824, respectively. Each of the column decoders 814 and 824 may control, in connection with the column selection circuit or the IO gating circuit, selection of one-page data, half-page data, or quarter-page data as data of the memory cell rows with respect to which an internal copy operation is to be performed.

FIG. 10 illustrates an internal bank copy operation 1010 performed in the first bank BANK_A and an inter-bank copy operation 1020 performed between the first bank BANK_A and the second bank BANK_B in connection with a one-page copy operation.

In the internal bank copy operation 1010, a one-page copy operation may be performed so that data of the first page PAGE_A is written to the second page PAGE_B. The first page PAGE_A and the second page PAGE_B may be located in different blocks within the first bank BANK_A.

In the one-page copy operation in the internal bank copy operation 1010, data of memory cells connected to the first page PAGE_A may be sensed and amplified by the bitline sense amplifiers of a block to which the first page PAGE_A belongs, and may be transmitted to the bitline sense amplifiers of a block to which the second page PAGE_B belongs. Thereafter, the sensed and amplified data may be written to memory cells connected to the second page PAGE_B.

In the one-page copy operation in the inter-bank copy operation 1020, data of memory cells connected to the first page PAGE_A of the first bank BANK1 may be output to the data path 830 of FIG. 8 via the bitline sense amplifiers of the block to which the first page PAGE_A belongs and the first column decoder 814. The data of the first page PAGE_A of the first bank BANK_A transmitted to the data path 830 of FIG. 8 may be written to the memory cells connected to the second page PAGE_B via the column selection circuit of the second column decoder 824 and a bitline sense amplifier of the block to which the second page PAGE_B belongs.

FIG. 11 illustrates an internal bank copy operation 1110 performed in the first bank BANK_A and an inter-bank copy operation 1120 performed between the first bank BANK_A and the second bank BANK_B in connection with a half-page copy operation.

In the internal bank copy operation 1110, a half-page copy operation may be performed so that half-page data from among the data of the first page PAGE_A is written to a half page of the second page PAGE_B. The first page PAGE_A and the second page PAGE_B may be set to be located in different blocks within the first bank BANK_A.

In the half-page copy operation in the internal bank copy operation 1110, half-page data from among the data of memory cells connected to the first page PAGE_A may be sensed and amplified by the bitline sense amplifiers of the block to which the first page PAGE_A belongs, and may be transmitted to the bitline sense amplifiers of the block to which the second page PAGE_B belongs. Thereafter, the sensed and amplified data may be written to a half of the memory cells connected to the second page PAGE_B.

In the half-page copy operation in the inter-bank copy operation 1120, half-page data from among the data of memory cells connected to the first page PAGE_A of the first bank BANK1 may be output to the data path 830 of FIG. 8 via the bitline sense amplifiers of the block to which the first page PAGE_A belongs and the first column decoder 814. The data of the first page PAGE_A of the first bank BANK_A transmitted to the data path 830 of FIG. 8 may be written to a half of the memory cells connected to the second page PAGE_B via the column selection circuit of the second column decoder 824 and the bitline sense amplifiers of the block to which the second page PAGE_B belongs.

FIG. 12 illustrates an internal bank copy operation 1210 performed in the first bank BANK_A and an inter-bank copy operation 1220 performed between the first bank BANK_A and the second bank BANK_B in connection with a quarter-page copy operation.

In the internal bank copy operation 1210, a quarter-page copy operation may be performed so that quarter-page data from among the data of the first page PAGE_A is written to a quarter of the second page PAGE_B. The first page PAGE_A and the second page PAGE_B may be set to be located in different blocks within the first bank BANK_A.

In the quarter-page copy operation in the internal bank copy operation 1210, quarter-page data from among the data of the memory cells connected to the first page PAGE_A may be sensed and amplified by the bitline sense amplifiers of the block to which the first page PAGE_A belongs, and may be transmitted to the bitline sense amplifiers of the block to which the second page PAGE_B belongs. Thereafter, the sensed and amplified data may be written to a quarter of the memory cells connected to the second page PAGE_B.

In the quarter-page copy operation in the inter-bank copy operation 1220, quarter-page data from among the data of the memory cells connected to the first page PAGE_A of the first bank BANK1 may be output to the data path 830 of FIG. 8 via the bitline sense amplifiers of the block to which the first page PAGE_A belongs and the first column decoder 814. The data of the first page PAGE_A of the first bank BANK_A transmitted to the data path 830 of FIG. 8 may be written to a quarter of the memory cells connected to the second page PAGE_B via the column selection circuit of the second column decoder 824 and the bitline sense amplifiers of the block to which the second page PAGE_B belongs.

In FIGS. 10-12, the one-page copy operation, the half-page copy operation, or the quarter-page copy operation may be performed according to the page size information PG_SIZE. Accordingly, internal copy operations with respect to various sizes of data may be performed.

Figure 13:
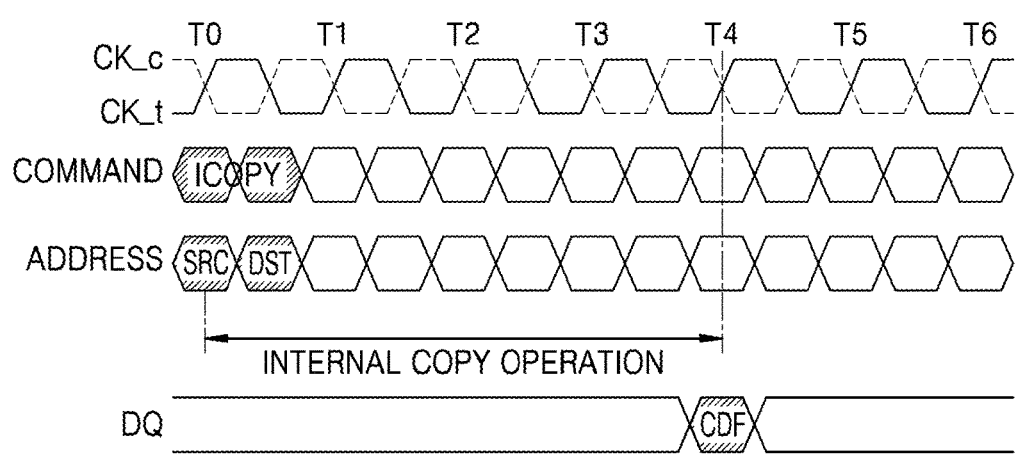
FIGS. 13 and 14 are timing diagrams for explaining transmissions of an internal copy command and a copy-done signal in the system of FIG. 1.
Figure 14:
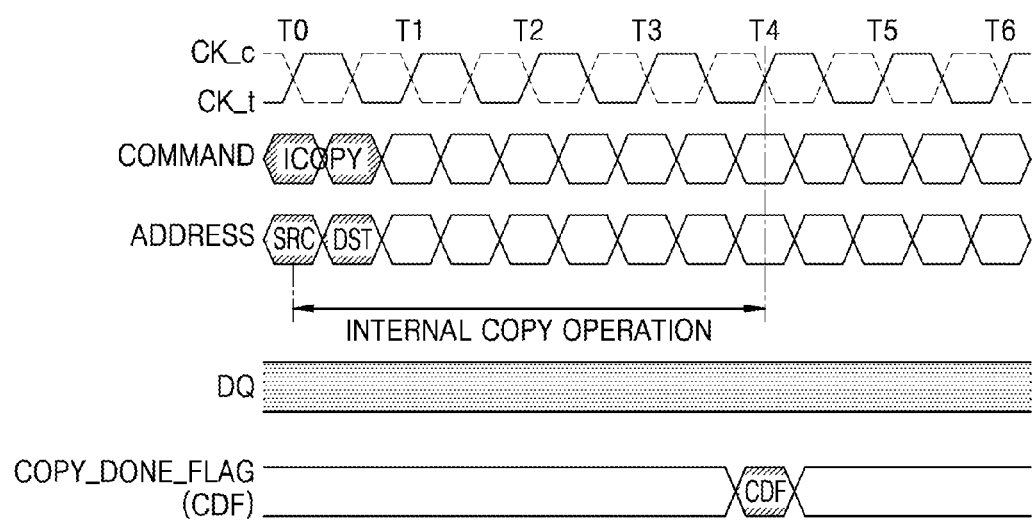

FIGS. 13 and 14 are timing diagrams for explaining transmission of an internal copy command and a copy-done signal in the system 100 of FIG. 1. FIG. 13 illustrates a method in which the copy-done signal is transmitted as the copy-done flag signal CDF via the DQ line 126 of the memory device 400, and FIG. 14 illustrates a method in which the copy-done signal is transmitted via a dedicated pin included in the memory device 400.

Referring to FIGS. 1 and 13, the memory controller 112 may transmit the internal copy command ICOPY_CMD to the memory device 400 in accordance with rising edges and/or falling edges of differential clocks CK_t and CK_c. The memory controller 112 may transmit the source address SRC_ADDR and the destination address DST_ADDR, where the internal copy command ICOPY_CMD is to be performed, and the page size information PG_SIZE to the memory device 400 at a time T0.

The memory device 400 may respond to the internal copy command ICOPY_CMD and select one internal copy operation from an internal block copy operation, an inter-bank copy operation, and an internal bank copy operation according to the source address SRC_ADDR, the destination address DST_ADDR, and the page size information PG_SIZE. The memory device 400 may generate the copy-done signal at a time T4 when the selected internal copy operation has been completed, and transmit the copy-done signal as the copy-done flag signal CDF to the memory controller 112 via the DQ line 126.

Referring to FIGS. 1 and 14, the memory device 400 may respond to the internal copy command ICOPY_CMD received from the memory controller 112 at the time T0, and select one internal copy operation from an internal block copy operation, an inter-bank copy operation, and an internal bank copy operation according to the source address SRC_ADDR, the destination address DST_ADDR, and the page size information PG_SIZE and perform the selected internal copy operation. The memory device 400 may generate the copy-done signal at the time T4 when the selected internal copy operation has been completed, and transmit the copy-done signal as the copy-done flag signal CDF to the memory controller 112 via a flag signal line, where the flag signal line may be a dedicated pin included in the memory device 400.

Figure 15:
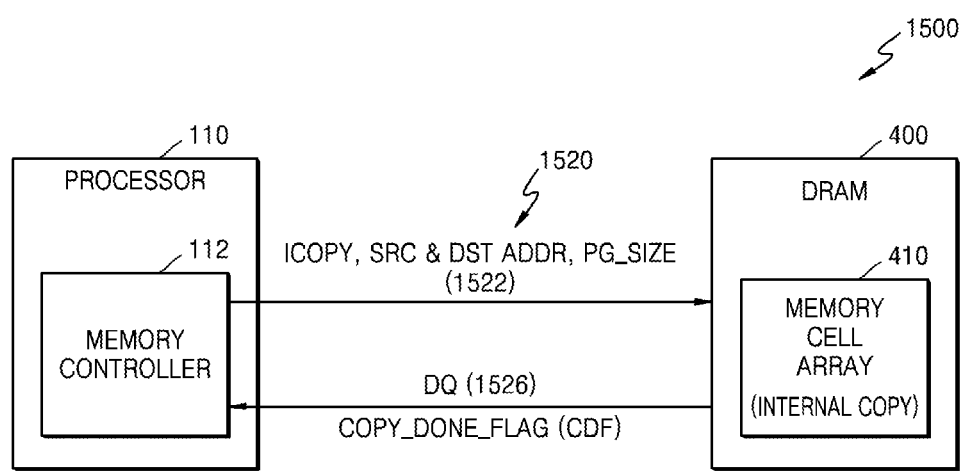
FIG. 15 is a block diagram of a system including the memory device capable of performing an internal copy operation, according to another example embodiment of the inventive concepts.

FIG. 15 is a block diagram of a system 1500 including the memory device 400 capable of performing an internal copy operation, according to another example embodiment of the inventive concepts.

Referring to FIG. 15, the system 1500 may be the same structure as the system 100 of FIG. 1 except for a bus 1520 that connects the memory controller 112 to the memory device 400. To avoid repeated descriptions, only the structure of the bus 1520 will now be described.

The bus 1520 may include a command/address line 1522 and a DQ line 1526. The memory controller 112 may transmit the internal copy command ICOPY_CMD, the source address SRC_ADDR, the destination address DST_ADDR, and the page size information PG_SIZE to the memory device 400 via the command/address line 1522. The internal copy command ICOPY_CMD, the source address SRC_ADDR, the destination address DST_ADDR, and the page size information PG_SIZE may be sequentially transmitted according to rising and/or falling edges of a clock signal.

The memory device 400 may respond to the internal copy command ICOPY_CMD received from the memory controller 112, and select one internal copy operation from an internal block copy operation, an inter-bank copy operation, and an internal bank copy operation according to the source address SRC_ADDR, the destination address DST_ADDR, and the page size information PG_SIZE and perform the selected internal copy operation. After the selected internal copy operation has been completed, the memory device 400 may generate a copy-done signal and transmit the copy-done signal as the copy-done flag signal CDF to the memory controller 112 via the DQ line 1526.

Figure 16:
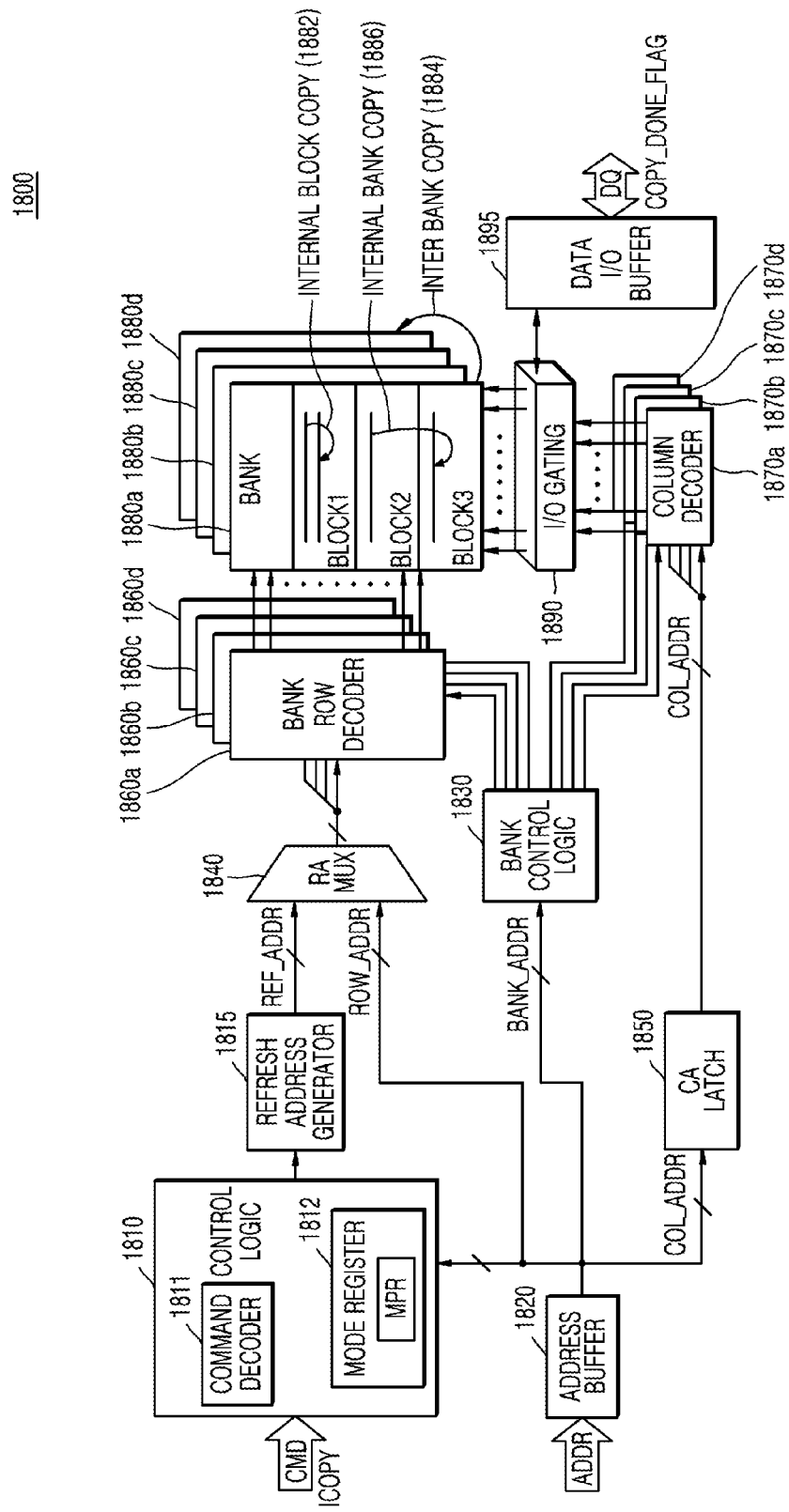
FIG. 16 is a block diagram of a memory device capable of performing an internal copy operation, according to an example embodiment of the inventive concepts.

FIG. 16 is a block diagram of a memory device 1800 capable of performing an internal copy operation, according to an example embodiment of the inventive concepts.

Referring to FIG. 16, the memory device 1800 may include a control logic 1810, a refresh address generator 1815, an address buffer 1820, a bank control logic 1830, a row address multiplexer 1840, a column address latch 1850, a row decoder, a memory cell array, a sense amplifier, an input/output (I/O) gating circuit 1890, and a data I/O buffer 1895.

A memory cell region may include first through fourth bank arrays 1880a through 1880d. Each of the first through fourth bank arrays 1880a through 1880d may include a plurality of blocks BLOCK1-BLOCK3. Each of the blocks BLOCK1 through BLOCK3 may include a plurality of memory cell rows (or pages), and sense amplifiers that sense and amplify memory cells respectively connected to the memory cell rows.

The row decoder may include first through fourth bank row decoders 1860a through 1860d respectively connected to the first through fourth bank arrays 1880a through 1880d. A column decoder may include first through fourth bank column decoders 1870a through 1870d respectively connected to the first through fourth bank arrays 1880a through 1880d.

The first through fourth bank arrays 1880a through 1880d, the first through fourth bank row decoders 1860a through 1860d, and the first through fourth bank column decoders 1870a through 1870d may form first through fourth memory banks, respectively. In FIG. 16, the memory device 1800 includes four memory banks, but example embodiments are not limited thereto.

According to some example embodiments, the memory device 1800 may be DRAM, such as double data rate synchronous DRAM (DDR SDRAM), low power double data rate (LPDDR) SDRAM, graphic double data rate (GDDR) SDRAM, or Rambus DRAM (RDRAM).

The control logic 1810 may control operations of the memory device 1800. For example, the control logic 1810 may generate control signals such that the memory device 1800 performs a write operation or a read operation. The control logic 1810 may include a command decoder 1811 that decodes a command CMD received from a memory controller, and a mode register 1812 that sets an operation mode of the memory device 1800. The command decoder 1811 may generate control signals corresponding to the command CMD by decoding a write enable signal /WE, a row address strobe signal /RAS, a column address strobe signal /CAS, or a chip select signal /CS.

The command decoder 1811 may receive a source address, a destination address, and page size information together with an internal copy command ICOPY_CMD from a memory controller and compare the source address with the destination address to determine an internal copy operation mode. The control logic 1810 may select an internal copy operation according to a result of the determination by the command decoder 1811 and control the selected internal copy operation to be performed on the first through fourth memory banks. The selected internal copy operation may be an internal block copy operation 1882, an inter-bank copy operation 1884, or an internal bank copy operation 1886.

In the internal block copy operation 1882, when the source address and the destination address indicate a same bank and a same block, data of a first memory cell row within a first block BLOCK1 within a bank array 1880a may be read and written to a second memory cell row within the first block BLOCK1 within the bank array 1880a. In the inter-bank copy operation 1884, when the source address and the destination address indicate different banks, data of the first bank array 1880a may be read and written to a fourth bank array 1880d. In the internal bank copy operation 1886, when the source address and the destination address indicate a same bank, data of a second block BLOCK2 within the first bank array 1880a may be read and written to a third block BLOCK 3 within the first bank array 1880a.

In the internal block copy operation 1882, the inter-bank copy operation 1884, or the internal bank copy operation 1886, one-page data, half-page data, or quarter-page data from among data of memory cell rows of the first through fourth memory banks may be copied according to the page size information.

The mode register 1812 may provide a plurality of operation options of the memory device 1800 and program various functions, characteristics, and modes of the memory device 1800. The mode register 1812 may store, in an MPR, a copy-done signal representing that execution of an internal copy operation in the first through fourth memory banks has been completed. The copy-done signal stored in the MPR may be output as the copy-done flag signal COPY_DONE_FLAG via a DQ pin or a dedicated pin.

The control logic 1810 may further receive differential clocks CK_t and CK_c and a clock enable signal CKE for driving the memory device 1800 in a synchronization manner. Data of the memory device 1800 may be operated at a double data rate. The clock enable signal CKE may be captured at a rising edge of the differential clock CK_t.

The control logic 1810 may control the refresh address generator 1815 to perform an auto-refresh operation in response to a refresh command, or to perform a self-refresh operation in response to a self-refresh enter command.

The refresh address generator 1815 may generate a refresh address REF_ADDR corresponding to a memory cell row on which a refresh operation is to be performed. The refresh address generator 1815 may generate the refresh address REF_ADDR in a refresh cycle defined by the standards of volatile memory devices.

The address buffer 1820 may receive an address ADDR including a bank address BANK_ADDR, a row address ROW_ADDR, and a column address COL_ADDR from the memory controller. The address buffer 1820 may provide the received bank address BANK_ADDR to the bank control logic 1830, provide the received row address ROW_ADDR to the row address multiplexer 1840, and provide the received column address COL_ADDR to the column address latch 1850.

The bank control logic 1830 may generate bank control signals in response to the bank address BANK_ADDR. In response to the bank control signals, a bank row decoder corresponding to the bank address BANK_ADDR from among the first through fourth bank row decoders 1860a through 1860d may be activated, and a bank column decoder corresponding to the bank address BANK_ADDR from among the first through fourth bank column decoders 1870a through 1870d may be activated.

The bank control logic 1830 may generate bank group control signals in response to the bank address BANK_ADDR for determining a bank group. In response to the bank group control signals, row decoders of a bank group corresponding to the bank address BANK_ADDR from among the first through fourth bank row decoders 1860a through 1860d may be activated, and column decoders of the bank group corresponding to the bank address BANK_ADDR from among the first through fourth bank column decoders 1870a through 1870d may be activated.

The row address multiplexer 1840 may receive the row address ROW_ADDR from the address buffer 1820 and the refresh address REF_ADDR from the refresh address generator 1815. The row address multiplexer 1840 may selectively output the row address ROW_ADDR or the refresh address REF_ADDR. The row address ROW_ADDR output from the row address multiplexer 1840 may be applied to each of the first through fourth bank row decoders 1860a through 1860d.

The bank row decoder activated by the bank control logic 1830 from among the first through fourth bank row decoders 1860a through 1860d may decode the row address ROW_ADDR output by the row address multiplexer 1840 and activate a word line corresponding to the row address ROW_ADDR. For example, the activated bank row decoder may apply a word line driving voltage to the word line corresponding to the row address ROW_ADDR.

The column address latch 1850 may receive the column address COL_ADDR from the address buffer 1820 and temporarily store the received column address COL_ADDR. The column address latch 1850 may gradually increase the column address COL_ADDR in a burst mode. The column address latch 1850 may apply the column address COL_ADDR that is temporarily stored or gradually increased to each of the first through fourth bank column decoders 1870a through 1870d.

The bank column decoder activated by the bank control logic 1830 from among the first through fourth bank column decoders 1870a through 1870d may activate a sense amplifier corresponding to the bank address BANK_ADDR and the column address COL_ADDR through the I/O gating circuit 1890.

The I/O gating circuit 1890 may include, together with circuits for gating I/O data, an input data mask logic, read data latches for storing data output from the first through fourth bank arrays 1880a through 1880d, and write drivers for writing data to the first through fourth bank arrays 1880a through 1880d.

Write data which is to be written to a memory cell array of one of the first through fourth bank arrays 1880a through 1880d may be provided from the memory controller to the data I/O buffer 1895 through the memory buffer. The write data provided to the data I/O buffer 1895 may be written to one bank array through a write driver.

Figure 17:
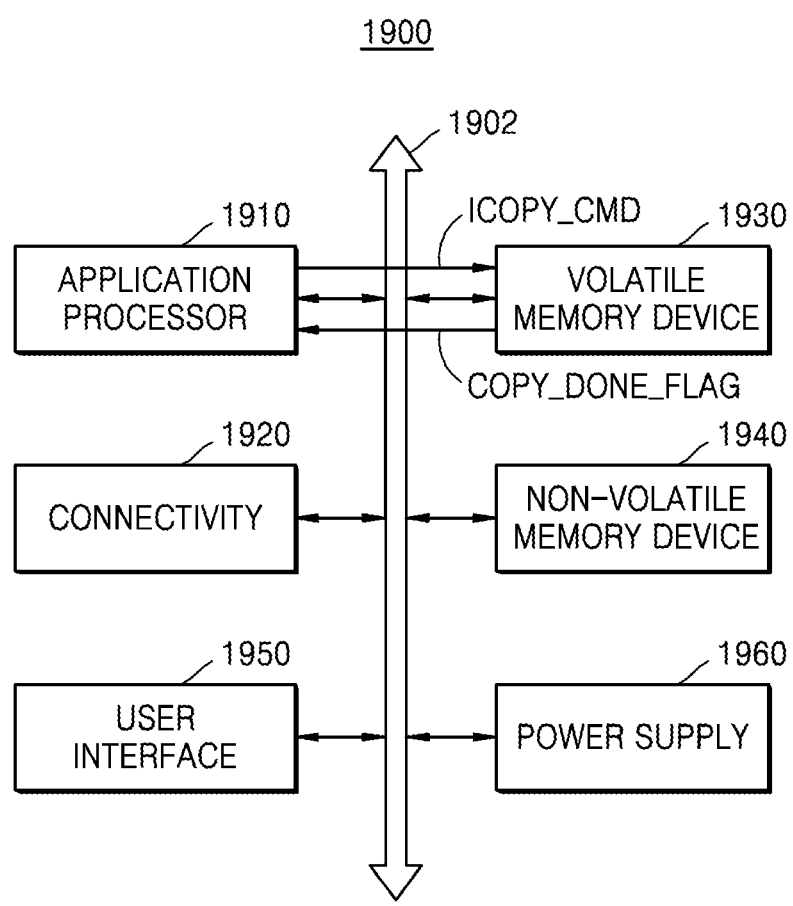
FIG. 17 is a block diagram of a mobile system to which a memory device capable of performing an internal copy

FIG. 17 is a block diagram of a mobile system 1900 to which a memory device capable of performing an internal copy operation is applied, according to an example embodiment of the inventive concepts.

Referring to FIG. 17, the mobile system 1900 may include an application processor 1910, a connectivity unit 1920, a first memory device 1930, a second memory device 1940, a user interface 1950, and a power supply source 1960, which are connected to each other via a bus 1902. The first memory device 1930 may be a volatile memory device, and the second memory device 1940 may be a nonvolatile memory device. According to some example embodiments, the mobile system 1900 may be any mobile system, such as a mobile phone, a smartphone, a personal digital assistant (PDA), a portable multimedia player (PMP), a digital camera, a music player, a portable game console, or a navigation system.

The application processor 1910 may execute applications that provide services, for example, an Internet browser, a game, and/or a video. According to some example embodiments, the application processor 1910 may include a single core processor or a multi-core processor. For example, the application processor 1910 may include a dual-core processor, a quad-core processor, or a hexa-core processor. According to some embodiments, the application processor 1910 may further include an internal or external cache memory.

The connectivity unit 1920 may perform wireless communication or wired communication with an external apparatus. For example, the connectivity unit 1920 may perform Ethernet communication, near field communication (NFC), radio frequency identification (RFID) communication, mobile telecommunication, memory card communication, or universal serial bus (USB) communication. For example, the connectivity unit 1920 may include a baseband chipset, and may support communication, such as global system for mobile communication (GSM), gross rating points (GRPS), wideband code division multiple access (WCDMA), or high speed packet access (HSxPA).

The first memory device 1930 that is a volatile memory device may store data processed by the application processor 1910 or may operate as a working memory. The first memory device 1930 may perform an internal copy operation in response to an internal copy command ICOPY_CMD received from the application processor 1910. The first memory device 1930 may receive a source address, a destination address, and page size information together with the internal copy command ICOPY_CMD from the application processor 1910, compare the source address with the destination address to determine an internal copy operation, and perform the determined internal copy operation. The determined internal copy operation may be an internal block copy operation, an inter-bank copy operation, or an internal bank copy operation.

In the internal block copy operation, when the source address and the destination address indicate a same bank and a same block, data of a first memory cell row within the block within the bank may be read and written to a second memory cell row within the block within the bank. In the inter-bank copy operation, when the source address and the destination address indicate different banks, data of a first bank may be read and written to a second bank. In the internal bank copy operation, when the source address and the destination address indicate a same bank, data of a first block within the bank may be read and written to a second block within the bank.

The internal block copy operation, the inter-bank copy operation, or the internal bank copy operation may be performed with respect to one-page data, half-page data, or quarter-page data according to the page size information. When the internal copy operation has been completed, the first memory device 1930 may output a copy-done flag signal COPY_DONE_FLAG to the application processor 1910.

The second memory device 1940 that is a nonvolatile memory device may store a boot image for booting the mobile system 1900. For example, the second memory device 1940 may be electrically erasable programmable read-only memory (EEPROM), a flash memory, phase change random access memory (PRAM), resistance random access memory (RRAM), nano-floating gate memory (NFGM), polymer random access memory (PoRAM), magnetic random access memory (MRAM), ferroelectric random access memory (FRAM), or a memory similar thereto.

The user interface 1950 may include at least one input device, such as a keypad or a touch screen, and/or at least one output device, such as a speaker or a display device. The power supply source 1960 may supply an operation voltage. According to some example embodiments, the mobile system 1900 may further include a camera image processor (CIP), and may further include a storage device, such as a memory card, a solid state drive (SSD), a hard disk drive (HDD), or a CD-ROM.

Figure 18:
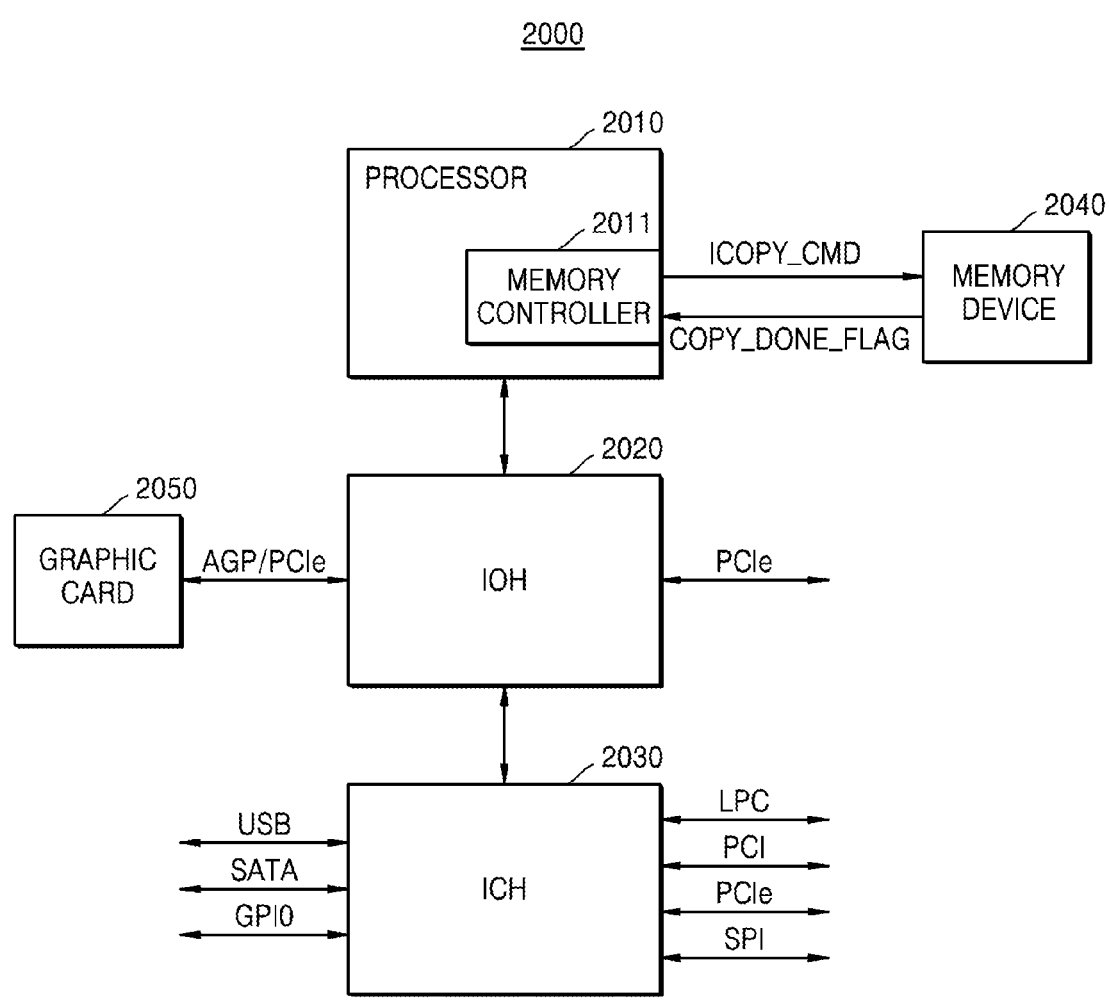
FIG. 18 is a block diagram of a computing system to which a memory device capable of performing an internal copy operation is applied, according to an example embodiment of the inventive concepts.

FIG. 18 is a block diagram of a computing system 2000 to which a memory device capable of performing an internal copy operation is applied, according to an example embodiment of the inventive concepts.

Referring to FIG. 18, the computing system 2000 includes a processor 2010, an I/O hub (IOH) 2020, an I/O controller hub (ICH) 2030, a memory device 2040, and a graphics card 2050. The computing system 2000 may be any computing system, such as a personal computer (PC), a server computer, a workstation, a laptop, a mobile phone, a smartphone, a PDA, a PMP, a digital camera, a digital television (DTV), a set-top box, a music player, a portable game console, or a navigation system.

The processor 2010 may execute various computing functions, such as certain calculations or tasks. For example, the processor 2010 may be a microprocessor or a central processing unit (CPU). According to some example embodiments, the processor 2010 may include a single core processor or a multi-core processor. For example, the processor 2010 may include a dual-core processor, a quad-core processor, or a hexa-core processor. In FIG. 18, the computing system 2000 includes one processor 2010, but according to example embodiments, the computing system 2000 may include a plurality of the processors 2010. According to some example embodiments, the processor 2010 may further include an internal or external cache memory.

The processor 2010 may include a memory controller 2011 that controls operations of the memory device 2040. The memory controller 2011 included in the processor 2010 may be referred to as an integrated memory controller (IMC). According to some example embodiments, the memory controller 2011 may be disposed inside the IOH 2020. The IOH 2020, including the memory controller 2011, may be referred to as a memory controller hub (MCH).

The memory device 2040 may perform an internal copy operation in response to an internal copy command ICOPY_CMD issued by the memory controller 2011. The memory device 2040 may receive a source address, a destination address, and page size information together with the internal copy command ICOPY_CMD from the application processor 1910, compare the source address with the destination address to determine an internal copy operation, and perform the determined internal copy operation. The determined internal copy operation may be an internal block copy operation, an inter-bank copy operation, or an internal bank copy operation.

In the internal block copy operation, when the source address and the destination address indicate a same bank and a same block, data of a first memory cell row within the block within the bank may be read and written to a second memory cell row within the block within the bank. In the inter-bank copy operation, when the source address and the destination address indicate different banks, data of a first bank may be read and written to a second bank. In the internal bank copy operation, when the source address and the destination address indicate a same bank, data of a first block within the bank may be read and written to a second block within the bank.

The internal block copy operation, the inter-bank copy operation, or the internal bank copy operation may be performed with respect to one-page data, half-page data, or quarter-page data according to the page size information. When the internal copy operation has been completed, the memory device 2040 may output a copy-done flag signal COPY_DONE_FLAG (CDF) to the memory controller 2011.

The IOH 2020 may manage data transmission between apparatuses, such as the graphics card 2050, and the processor 2010. The IOH 2020 may be connected to the processor 2010 via any type of interface. For example, the IOH 2020 and the processor 2010 may be connected to each other via an interface according to any of various standards, such as a front side bus (FSB), a system bus, a HyperTransport, a lighting data transport (LDT), a quick pth interconnect (QPI), a common system interface, and peripheral component interface-express (CSI). In FIG. 18, the computing system 2000 includes one IOH 2020, but according to example embodiments, the computing system 2000 may include a plurality of the IOHs 2020.

The IOH 2020 may provide various interfaces with apparatuses. For example, the IOH 2020 may provide an accelerated graphics port (AGP) interface, a peripheral component interface-express (PCIe) interface, or a communication streaming architecture (CSA) interface.

The graphics card 2050 may be connected to the IOH 2020 through AGP or PCIe. The graphics card 2050 may control a display device (not shown) for displaying an image. The graphics card 2050 may include an internal processor and an internal semiconductor memory device for processing image data.

According to some example embodiments, the IOH 2020 may include a graphics device therein together with or instead of the graphics card 2050 disposed outside the IOH 2020. The graphics device included in the IOH 2020 may be referred to as integrated graphics. The IOH 2020, including a memory controller and a graphics device, may be referred to as a graphics and memory controller hub (GMCH).

The ICH 2030 may perform data buffering and interface arbitration such that various system interfaces efficiently operate. The ICH 2030 may be connected to the IOH 2020 through an internal bus. For example, the IOH 2020 and the ICH 2030 may be connected to each other via a direct media interface (DMI), a hub interface, an enterprise Southbridge interface (ESI), or PCIe.

The ICH 2030 may provide various interfaces with peripheral devices. For example, the ICH 2030 may provide a USB port, a serial advanced technology attachment (SATA) port, a general purpose I/O (GPIO), a low pin count (LPC) bus, a serial peripheral interface (SPI), PCI, or PCIe.

According to some example embodiments, at least two selected from the processor 2010, the IOH 2020, and the ICH 2030 may be realized in one chipset.

While example embodiments of the inventive concepts have been particularly shown and described with reference to some example embodiments thereof, it will be understood that various changes in form and details may be made therein without departing from the spirit and scope of the following claims.

What is claimed is:

1. A memory device comprising:
a memory cell array including at least one bank that includes at least one block, each of the at least one block having a plurality of memory cell rows having memory cells therein; and
processing circuitry configured to,
receive, from an external source, an internal copy command along with a source address and a destination address associated therewith, the source address indicating a source bank of the at least one bank and a source block of the at least one block within the source bank, and the destination address indicating a destination bank of the at least one bank and a destination block of the at least one block within the destination bank,
compare one or more of (i) the source bank and the destination bank and (ii) the source block and the destination block,
generate one or more of a bank comparison signal and a block comparison signal based on a result of comparing the one or more of (i) the source bank with the destination bank and (ii) the source block with the destination block, the bank comparison signal indicating whether the source bank and the destination bank are a same bank or different banks, and the block comparison signal indicating whether the source block and the destination block are a same block or different blocks,
select a selected internal copy operation from among an internal block copy operation, an inter-bank copy operation or an internal bank copy operation based on the one or more of the bank comparison signal and the block comparison signal,
perform the selected internal copy operation on the memory cell array from the memory cells associated with the source address to the memory cells associated with the destination address, and
output a copy-done signal indicating that the selected internal copy operation is complete, if the selected internal copy operation is complete.

2. The memory device of claim 1, wherein the processing circuitry is further configured to,
receive page size information associated with the selected internal copy operation from the external source, and
instruct the memory cell array to perform the selected internal copy operation based on the page size information.

3. The memory device of claim 2, wherein, the processing circuitry is configured to instruct the memory cell array to perform the selected internal copy operation in units of one-page data, half-page data, or quarter-page data of one of the plurality of memory cell rows based on the page size information.

4. The memory device of claim 1, wherein the processing circuitry comprises:
a first comparator configured to output the bank comparison signal based on a bank address associated with the source address and a bank address associated with the destination address; and
a second comparator configured to output the block comparison signal based on a block address associated with the source address and a block address associated with the destination address.

5. The memory device of claim 4, wherein
the processing circuitry is configured to select the internal block copy operation as the selected internal copy operation, if the bank comparison signal and the block comparison signal indicate that the source address and the destination address are associated with the same bank and the same block, and
the internal block copy operation is an operation of writing, via a sense amplifier, data of the memory cells connected to a first memory cell row in the same block within the same bank to the memory cells connected to a second memory cell row in the same block within the same bank.

6. The memory device of claim 4, wherein
the processing circuitry is configured to select the inter-bank copy operation as the selected internal copy operation, if the bank comparison signal indicates that the source address and the destination address are associated with the different banks, and
the inter-bank copy operation is an operation of writing, via a data path, data of the memory cells connected to a first memory cell row in a first bank to the memory cells connected to a second memory cell row in a second bank.

7. The memory device of claim 4, wherein
the processing circuitry is configured to select the internal bank copy operation as the selected internal copy operation, if the bank comparison signal and the block comparison signal indicate that the source block and the source bank and the destination block and the destination bank are the same bank and the different blocks, and
the internal bank copy operation is an operation of writing, via first sense amplifiers of a first block and second sense amplifiers of a second block, data of the memory cells connected to a first memory cell row in the first block within the same bank to the memory cells connected to a second memory cell row in the second block within the same bank.

8. The memory device of claim 1, wherein the processing circuitry is configured to store the copy-done signal in a Multi Purpose Register (MPR) of a mode register of the memory device.

9. The memory device of claim 8, wherein the mode register is configured to output the copy-done signal according to a mode register read command.

10. The memory device of claim 8, wherein the mode register is configured to output the copy-done signal via a data input/output (DQ) pin of the memory device.

11. The memory device of claim 8, wherein the mode register is configured to output the copy-done signal via a dedicated pin included in the memory device.

12. A system comprising:
a memory controller configured to transmit an internal copy command along with a source address and a destination address associated therewith; and
a memory device including a memory cell array and processing circuitry, the memory cell array including at least one bank that includes at least one block, each of the at least one block having a plurality of memory cell rows, the processing circuitry configured to,
receive, from the memory controller, the internal copy command along with the source address and the destination address associated therewith, the source address indicating a source bank of the at least one bank and a source block of the at least one block within the source bank, and the destination address indicating a destination bank of the at least one bank and a destination block of the at least one block within the destination bank, compare one or more of (i) the source bank and the destination bank and (ii) the source block and the destination block, generate one or more of a bank comparison signal and a block comparison signal based on a result of comparing the one or more of (i) the source bank with the destination bank and (ii) the source block with the destination block, the bank comparison signal indicating whether the source bank and the destination bank are a same bank or different banks, and the block comparison signal indicating whether the source block and the destination block are a same block or different blocks, select a selected internal copy operation from among an internal block copy operation, an inter-bank copy operation or an internal bank copy operation based on the one or more of the bank comparison signal and the block comparison signal, perform the selected internal copy operation on the memory cell rows, and output a copy-done signal indicating that the selected internal copy operation is complete, if the selected internal copy operation is complete.

13. The system of claim 12, wherein
the memory controller is configured to transmit page size information associated with the selected internal copy operation, and
the processing circuitry of the memory device is configured to perform the selected internal copy operation on the memory cell rows according to the page size information.

14. The system of claim 12, wherein
the processing circuitry of the memory device is configured to perform the internal block copy operation as the selected internal copy operation, if the source bank and the destination bank are the same bank and the source block and the destination block are the same block, and
the internal block copy operation is an operation of reading read data of a first memory cell row within the same block within the same bank and writing the read data to a second memory cell row within the same block within the same bank.

15. The system of claim 12, wherein
the processing circuitry of the memory device is configured to perform the inter-bank copy operation as the selected internal copy operation, if the source bank and the destination bank are different banks, and
the inter-bank copy operation is an operation of reading data of a first bank and writing the read data to a second bank.

16. The system of claim 12, wherein
the processing circuitry of the memory device is configured to perform the internal bank copy operation, if the source bank and the destination bank are the same bank, and
the internal bank copy operation is an operation of reading read data of a first block within the same bank and writing the read data to a second block within the same bank.

17. A memory device comprising:
a memory cell array including at least one bank that includes at least one block, each of the at least one block having memory cells therein; and
a controller configured to,
receive, from an external memory controller, an internal copy command along with a source address and a destination address associated therewith, the source address indicating a source bank of the at least one bank and a source block of the at least one block within the source bank, and the destination address indicating a destination bank of the at least one bank and a destination block of the at least one block within the destination bank, compare one or more of (i) the source bank and the destination bank and (ii) the source block and the destination block, generate one or more of a bank comparison signal and a block comparison signal based on a result of comparing the one or more of (i) the source bank with the destination bank and (ii) the source block with the destination block, the bank comparison signal indicating whether the source bank and the destination bank are a same bank or different banks, and the block comparison signal indicating whether the source block and the destination block are a same block or different blocks, select a selected internal copy operation from among an internal block copy operation, an inter-bank copy operation or an internal bank copy operation based on the one or more of the bank comparison signal and the block comparison signal, and perform the selected internal copy operation on the memory cell array from the memory cells associated with the source address to the memory cells associated with the destination address.

18. The memory device of claim 17, wherein the controller is configured to output a copy-done signal, if the selected internal copy operation is complete.

19. The memory device of claim 17, wherein the controller is configured to perform the selected internal copy operation by,
perform the internal block copy operation by copying data from one memory cell row to another memory cell row associated with a same block within a same bank, if the source bank the destination bank are the same bank and the source block and the destination block are the same block,
perform the inter-bank copy operation by copying data from one memory cell row to another memory cell row associated with different banks, if the source bank and the destination bank are different banks, and
perform the internal bank copy operation by copying data from one memory cell row to another memory cell row associated with a different block within the same bank, if the source block and the destination block are different blocks within the same bank.

20. The memory device of claim 17, wherein the controller is configured to perform the selected internal copy operation autonomously upon receipt of the internal copy command from the external memory controller such that the selected internal copy operation is performed without further instructions from the external memory controller.

* * * * *